United States Patent
Sha et al.

(10) Patent No.: US 12,468,631 B2
(45) Date of Patent: Nov. 11, 2025

(54) REGION AWARE DELTA PREFETCHER

(71) Applicant: Intel Corporation, Santa Clara, CA (US)

(72) Inventors: Swaraj Sha, Bangalore (IN); Anant Vithal Nori, Bangalore (IN); Sreenivas Subramoney, Bangalore (IN); Stanislav Shwartsman, Haifa (IL); Pavel I. Kryukov, Moscow (RU); Lihu Rappoport, Haifa (IL)

(73) Assignee: Intel Corporation, Santa Clara, CA (US)

( * ) Notice: Subject to any disclaimer, the term of this patent is extended or adjusted under 35 U.S.C. 154(b) by 724 days.

(21) Appl. No.: 17/561,831

(22) Filed: Dec. 24, 2021

(65) Prior Publication Data

US 2023/0205699 A1 Jun. 29, 2023

(51) Int. Cl.
*G06F 12/08* (2016.01)
*G06F 9/38* (2018.01)
*G06F 12/0811* (2016.01)
*G06F 12/0862* (2016.01)
*G06F 12/0877* (2016.01)

(52) U.S. Cl.
CPC ........ *G06F 12/0862* (2013.01); *G06F 9/3816* (2013.01); *G06F 12/0811* (2013.01); *G06F 12/0877* (2013.01)

(58) Field of Classification Search
CPC .... G06F 12/08; G06F 12/0862; G06F 9/3816; G06F 12/0811; G06F 12/0877; G06F 12/0873
See application file for complete search history.

(56) References Cited

U.S. PATENT DOCUMENTS 10,331,567 B1 * 6/2019 Meier ................. G06F 12/0862
10,866,896 B2 12/2020 Rafacz et al.
(Continued)

FOREIGN PATENT DOCUMENTS

WO WO-2024039953 A1 * 2/2024 ......... G06F 12/0862

OTHER PUBLICATIONS

J. So and M. Lu, "Buffer-referred Data Prefetching: An Effective Approach to Coverage-Driven Prefetching," 2021 26th International Conference on Automation and Computing (ICAC), Portsmouth, United Kingdom, 2021, pp. 1-6.*
(Continued)

*Primary Examiner* — Pierre Michel Bataille
(74) *Attorney, Agent, or Firm* — Alliance IP, LLC

(57) ABSTRACT

An apparatus includes memory circuitry including a first data structure and prefetch circuitry that is coupled to the memory circuitry. The prefetch circuitry is to store, in the first data structure, a first subregion entry corresponding to a first subregion of a memory region allocated to a program. The first subregion entry is to include a plurality of delta values. A first delta value of the plurality of delta values represents a first distance between two cache lines associated with consecutive memory accesses within a second subregion of the memory region. The prefetch circuitry is further to detect a first memory access of a first cache line in the first subregion, identify prefetch candidates based on the first cache line and the plurality of delta values, and issue at least one prefetch request based on at least two of the prefetch candidates to be prefetched into a cache.

25 Claims, 13 Drawing Sheets

SETS OF DELTA INFORMATION (E.G., 1-16)

(56) References Cited

U.S. PATENT DOCUMENTS

| | | | |
|---|---|---|---|
| 11,874,773 B2* | 1/2024 | Bera | G06F 12/0862 |
| 2010/0281221 A1 | 11/2010 | Cantin et al. | |
| 2019/0065375 A1* | 2/2019 | Al Sheikh | G06F 12/1063 |
| 2019/0138451 A1* | 5/2019 | Alam | G06F 12/0862 |
| 2020/0133863 A1* | 4/2020 | Pusdesris | G06F 12/0862 |
| 2021/0157730 A1 | 5/2021 | Hornung et al. | |
| 2021/0406183 A1* | 12/2021 | Mashimo | G06F 12/0862 |

OTHER PUBLICATIONS

M. Shevgoor, S. Koladiya, R. Balasubramonian, C. Wilkerson, S. H. Pugsley and Z. Chishti, "Efficiently prefetching complex address patterns," 2015 48th Annual IEEE/ACM International Symposium on Microarchitecture (MICRO), Waikiki, HI, USA, 2015, pp. 141-152.*

E. Bhatia, G. Chacon, S. Pugsley, E. Teran, P. V. Gratz and D. A. Jiménez, "Perceptron-Based Prefetch Filtering," 2019 ACM/IEEE 46th Annual International Symposium on Computer Architecture (ISCA), Phoenix, AZ, USA, 2019, pp. 1-13.*

K. J. Nesbit and J. E. Smith, "Data Cache Prefetching Using a Global History Buffer," 10th International Symposium on High Performance Computer Architecture (HPCA'04), Madrid, Spain, 2004, pp. 96-96.*

P. Michaud, "Best-offset hardware prefetching," 2016 IEEE International Symposium on High Performance Computer Architecture (HPCA), Barcelona, Spain, 2016, pp. 469-480.*

EPO European Extended Search Report in EP Application Serial No. 22208765.2 mailed on May 30, 2023, 7 pages.

Bakhshalipour, Mohammad et al., "A Survey on Recent Hardware Data Prefetching Approaches with an Emphasis on Servers," 2020 retrieved from https://arxiv.org/pdf/2009.00715, (2020), (23 pages).

Bakhshalipour, Mohammad et al., "Domino Temporal Data Prefetcher," 2018 IEEE International Symposium on High Performance Computer Architecture, (2018), (12 pages).

Jain, Akanksha et al., "Linearizing irregular memory accesses for improved correlated prefetching" 2013 In Proceedings of the 46th Annual IEEE/ACM International Symposium on Microarchitecture (MICRO-46). Association for Computing Machinery, New York, NY, USA,, (2013), (13 pages).

Michaud, Pierre, "A Best-Offset Prefetcher," 2nd Data Prefetching Championship, Jun. 2015, Portland, US (6 pages).

Michaud, Pierre, "Best Offset Hardware Prefetching," International Symposium on High-Performance Computer Architecture, Mar. 2016, Barcelona Spain (13 pages).

Somogyi, Stephen et al., "Spatial memory streaming" 2006 In Proceedings of the 33rd International Symposium on Computer Architecture, (2006), (13 pages).

Somogyi, Stephen et al., "Spatio-temporal memory streaming" 2009 In Proceedings of the 36th annual international symposium on Computer architecture (ISCA '09). Association for Computing Machinery, New York, NY, USA, (2009), (12 pages).

Wu, Hao et al., "Efficient Meta-Data Management for Irregular Data Prefetching" 2019 ISCA 2019, retrieved from https://www.cs.utexas.edu/~lin/papers/isca19.pdf, (2019), (13 pages).

Wu, Hao et al., "Temporal Prefetching Without the Off-Chip Metadata" 2019 In Proceedings of the 52nd Annual IEEE/ACM International Symposium on Microarchitecture (MICRO '52). Association for Computing Machinery, New York, NY, USA, (2019), (13 pages).

Wu, Hao, "Practical Irregular Prefetching" Dissertation Presented to the Faculty of the Graduate School of The University of Texas at Austin, Aug. 2020, Austin, US (108 pages).

* cited by examiner

REGION AWARE DELTA PREFETCHER

TECHNICAL FIELD

The present disclosure relates in general to the field of processing systems, and more particularly, to a region aware delta prefetcher.

BACKGROUND

Memory prefetching is a technique implemented by many modern computer processors to enhance core performance. Prefetching can be utilized to speed up fetch operations for instructions or data and reduce latency. Generally, a processor monitors the memory access patterns of an executing application and tries to predict the instructions or data that will be accessed by a processor during the execution of the application. Identified instructions or data are fetched from their original storage location in slower memory and moved into a faster local memory before the identified instructions or data are needed by the application. The local memory is typically a cache and allows significantly faster accesses to its contents than main memory accesses or lower level storage accesses as the cache is closer to the processor. Nevertheless, latency remains a bottleneck in high performance cores.

DETAILED DESCRIPTION

Figure 1:
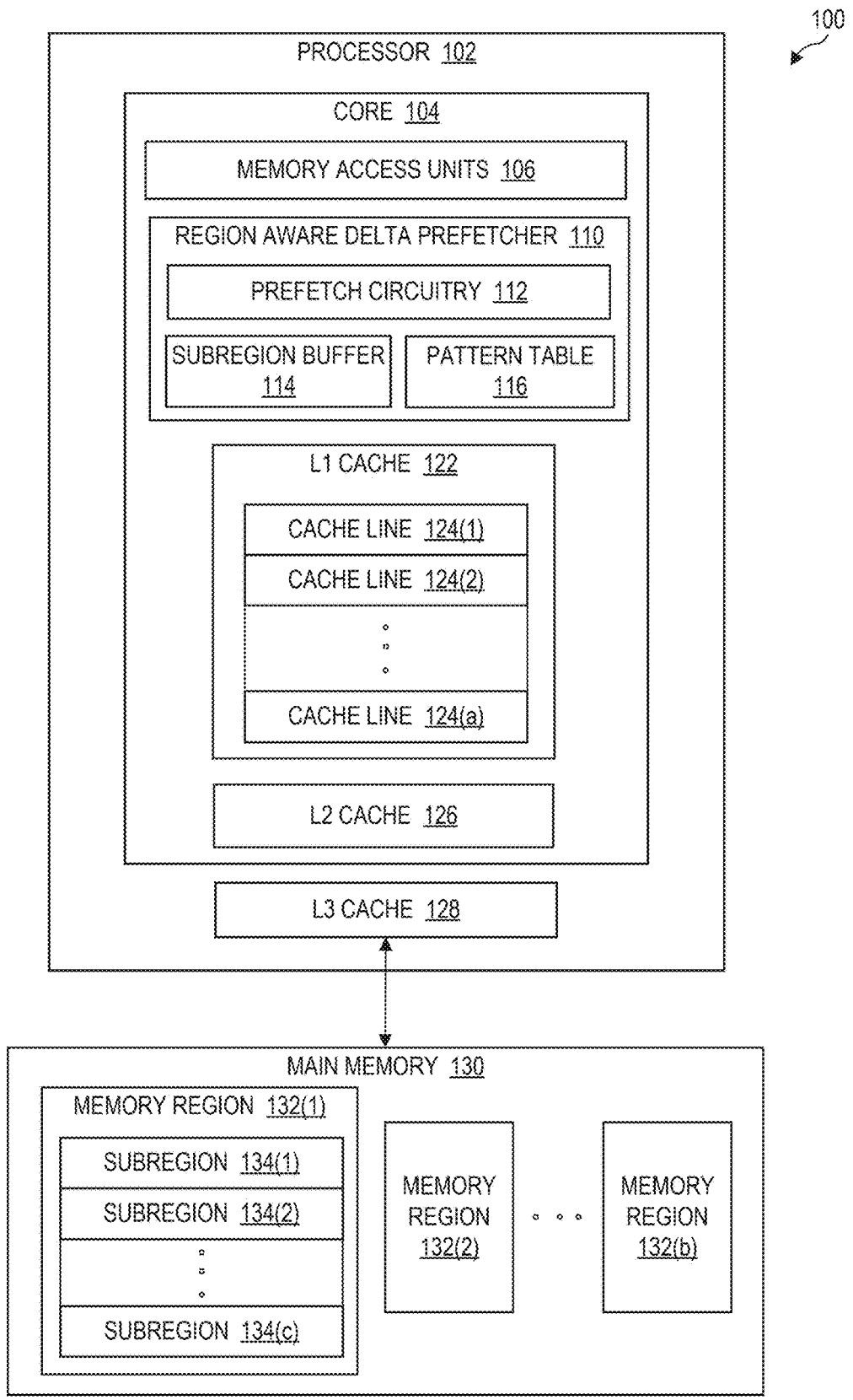
FIG. 1 is a simplified block diagram of a computing system implementing region aware delta prefetching according to at least one embodiment.

The present disclosure provides various possible embodiments, or examples, of systems, methods, apparatuses, architectures, and machine readable media for supporting a region aware delta prefetcher for memory accesses. In particular, embodiments disclosed herein provide a lightweight spatio-temporal prefetcher that learns multiple frequently occurring deltas per large linear address region. Deltas may be learned in one or more subregions of the large linear address region and then applied to the larger region. Each of the subregions in a larger memory region continues to track deltas during a program execution, but may use the most frequently occurring deltas that have been learned for prefetching.

To better understand the techniques of the various embodiments in this disclosure, the following contextual information related to the challenges of effective prefetching to reduce latency and in computing systems is discussed.

Meeting the memory demands of modern processors is a significant factor in optimizing processor core performance. Memory latency remains a key bottleneck in high performance cores. Larger out-of-order execution windows (e.g., modern high-performance cores) can hide latency to an extent, but the accompanying increased out-of-order executions widths (e.g., wider cores that retire more instructions per clock cycle) reduce this latency hiding. Larger on-die caches hold more data in faster memory. However, while outer level cache sizes (e.g., level 2 (L2), level 3 (L3), etc.) typically grow in modern cores, the innermost, and usually the fastest cache (e.g., level 1 (L1)) can remain constrained due to access latency requirements. Furthermore, caching cannot help with cold (i.e., first time seen) accesses.

Aggressive prefetching remains an important approach for mitigating latency bottlenecks. Generally, prefetching involves predicting memory addresses that will be used in the near future by a central processing unit (CPU) during a program execution, and then fetching the data or instructions from those memory addresses to store in memory that is closer to the CPU, such as cache. When prefetching is targeted to the innermost L1 cache, accurate access predictions are needed. Out-of-order execution of instructions, and the accompanying irregular access patterns, however, make it harder to predict accesses accurately. Some approaches use program context (e.g., information about a program execution such as load/branch instruction pointers (IPs) and their history, temporal history of load addresses, etc.) to predict memory accesses of a program. While an increased view of program context (e.g., load/branch instruction pointers (IPs) and their history, temporal history of load addresses, etc.) can help improve accuracy, using such information may consume a prohibitive amount of storage that often renders it use impractical.

Many existing prefetcher solutions are inadequate based on multiple prefetcher metrics including accuracy, coverage, and storage cost. Generally, prefetchers may be described as either spatial or temporal. Spatial prefetchers may attempt to predict future memory accesses by relying on similar access patterns. A spatial prefetcher may determine strides or deltas, which represent some relation to previous accesses and can be used to predict upcoming accesses. A delta is the difference between memory addresses associated with the cacheline of a current memory access and the cacheline of the next memory access. The memory address associated with a cacheline that is used to calculate a delta value may be the beginning of the cacheline (e.g., cacheline boundary), the end of the cacheline, the middle of the cacheline, or any other consistent offset related to the cacheline.

In one known spatial prefetcher, a single best cacheline delta may be calculated and the resulting delta value may be used for prefetches. Predicting only one cacheline delta reduces the coverage of accesses. In addition, without program context, accuracy is also lacking and thus, is not used to prefetch into the innermost L2 data cache for maximum latency hiding.

Temporal prefetchers memorize address streams and determine the order of memory addresses in the address streams. For example, global streams or address streams per load may be memorized. Because significant storage space is needed to memorize the actual memory addresses in an address stream, temporal prefetchers often suffer from prohibitive storage costs (e.g., 100s of KB to 1-10 or more MB). In addition, stream memorization assumes that the same sequence of addresses recurs even though this is often not the case. This assumption can hurt prefetch accuracy and coverage. Furthermore, unlike delta prediction, address memorization prefetches cannot prefetch cold (first time seen) accesses.

Even the combination of the above described temporal streaming memorization and spatial memory prefetching can be cost-prohibitive and lack coverage and accuracy. The temporal portion that performs stream memorization may still consume a prohibitive amount of storage. In addition, the spatial prefetching that may be performed once the temporal prefetching has completed may lack accuracy and coverage as previously described.

A region aware delta (RAD) prefetcher, as described herein, can resolve many of the aforementioned issues (and more). The RAD prefetcher is a combined spatial and temporal (spatio-temporal) prefetcher that exploits region aware delta learning to achieve more accuracy in predictions and targets high coverage by issuing multiple deltas. Additionally, the RAD prefetcher is light-weight and its functionality is achieved at a low hardware cost. In one or more embodiments, the RAD prefetcher includes a spatial component to learn multiple frequently occurring deltas per large address region, and a temporal component to learn deltas per memory region during a temporal window. Generally, a temporal window may be defined as a period during a program execution in which deltas may be calculated for a particular memory region.

A region aware delta prefetcher, as disclosed herein, advantageously improves accuracy and performance. The combined spatial and temporal components of a RAD prefetcher offer significant advantages. Learning multiple deltas (spatial component) can increase the coverage of prefetches as the system is not limited to a single delta value for calculating memory addresses to be prefetched. Thus, having multiple deltas increases the number of predictions that are possible and therefore, prefetching coverage is increased. Additionally, learning these deltas per large address region, enables high accuracy. Thus, prefetching may be performed in the innermost data cache, level 1 (L1). Furthermore, even with the temporal component of embodiments described herein, a RAD prefetcher can have extremely low storage requirements (e.g., ~4.5 KB). Thus, bounded accuracy prefetching for irregular access streams can be provided at a low hardware cost. This characteristic enables practical implementations for modern cores. The low storage is derived from using delta information for large linear regions because fewer regions need to be tracked, and from learning information on subsets of that region because lesser information needs to be observed while learning. Additionally, key workload categories can experience significant performance improvement. This performance improvement results from both irregular access prefetching as well as strided access prefetching that current stride prefetchers miss due to out-of-order reordering.

With reference now made to the drawings, FIG. 1 is simplified a block diagram of an example computing system 100 for providing region aware delta prefetching. A brief discussion is now provided about some of the infrastructure that may be included in computing system 100. Computing system 100 can include a processor 102 including a core 104 coupled to main memory 130. Core 104 includes memory access units 106, a region aware delta (RAD) prefetcher 110, level 1 (L1) cache 122, and level 2 (L2) cache 126. Level 3 (L3) cache 126 may also be provided on processor 102 and could be accessible to core 104 and any other cores of the processor 102. L1 cache 122 may be on the die with core 104 and is typically the fastest memory accessible to core 104. In some configurations, L1 cache 122 may include separate caches for data and instructions (or code). In other configurations, L1 cache 122 may combine data and instructions. The size of L1 cache 122 may vary, but generally L1 cache 122 is smaller (and faster) than any of the other caches, including L2 cache 124.

Computing system 100 is intended to represent any type of device in which region aware delta prefetching can be implemented (e.g., RAD prefetcher 110). Computing systems can include, but are not limited to, servers, desktops, laptops, workstations, tablets, mobile devices, smartphones, etc. (any of which may include physical hardware or a virtual implementation on physical hardware), or any other device, component, or element capable of implementing region aware delta prefetching. At least some computing systems may also be inclusive of a suitable interface to a human user (e.g., display screen, etc.) and input devices (e.g., keyboard, mouse, trackball, touchscreen, etc.) to enable a human user to interact with the computing system.

Generally, processor 102 may be a single or multi-core processor comprising circuitry to process instructions that drive the computing system. Processor 102 may use one or more levels of cache (e.g., L1 cache 122, L2 cache 124, L3 cache 126) to access data from memory 130. Memory 130 represents main memory and/or storage devices of the computing system. Main memory may be an internal physical memory such as, for example, random access memory (RAM), dynamic random access memory (DRAM), synchronous dynamic random access memory (SDRAM), static random access memory (SRAM), read-only memory (ROM), programmable ROM (PROM), erasable PROM (EPROM), electrically EPROM (EEPROM), or other types of machine-readable storage media that are capable of storing data and information. Processor 102 may also be coupled to storage devices that include non-volatile memory such hard disk drives (HDDs), solid state drives (SSDs), one or more removable storage devices, and/or other media. In particular embodiments, a storage device is slower than main memory 130, and main memory 130 is slower than caches 122, 126, and 128. Main memory 130 (and storage devices) has a higher capacity, and/or is generally used for longer term data storage.

Main memory 130 and cache 122, 126, and 128 can be organized in cache lines. A cache line is the unit of data transfer between main memory 130 and caches 122, 126, and 128. In computing system 100, cache lines 124(1)-124(*a*) are illustrated in L1 cache 122. In a common example, a cache line is 64 bytes. However, it should be apparent that different architectures may use different cache line sizes.

Generally, data flows from main memory 130, to L3 cache 128, then to L2 cache 126, and finally to L1 cache 122, and in reverse when data is written. L1 cache 122 can be quickly accessed by the core 104, for example, using read operations and write operations. In some implementations, program instructions may be sequestered from other data and stored in a separate, but co-located L1 cache. As used herein, the term "data" refers to any type of numeric, voice, video, or script data, or any type of source or object code, program instructions, or any other suitable information in any appropriate format that may be communicated from one point to another in computing systems and/or networks.

In one or more embodiments, memory may be managed using region-based memory management. In region-based managed memory, the memory may be organized in multiple memory regions (e.g., linear address regions), and each memory allocation is assigned to a particular memory region. This enables objects to be efficiently allocated, and allocated objects to be efficiently deallocated. In the example of computing system 100, main memory 130 is depicted with example memory regions 132(1)-132(*b*), which may be defined for a program to execute on processor 102. In one or more embodiments of region aware delta prefetching, each memory region may be divided into multiple subregions. For example, memory region 132(1) is shown with subregions 134(1)-134(*c*). Within each subregion, multiple cache lines may be stored. Any number (e.g., 0, 1, 2, etc.) of the cache lines in a subregion may be stored the caches, including L1 cache 122, at any given time, depending on which memory regions and subregions are being accessed by the program at that time.

In one example, memory regions 132(1)-132(*b*) may be 32 kilobytes (KB) and the cache lines may be 64 bytes (B), resulting in 512 cache lines. In one or more embodiments, subregions 134(1)-134(*c*) may be 8 KB. Thus, a memory region that is 32 KB is size may be divided into four 8 KB subregions, each containing one hundred twenty-eight 64B cache lines. Although specific examples of sizes for memory structures such as cache lines 124(1)-0124(*a*), memory regions 132(1)-132(*b*), and subregions 134(1)-134(*c*), have been provided herein, it should be apparent that the size of a cache line, memory region, and/or subregion may vary depending on particular architectures and implementations. Furthermore, while embodiments of systems implementing region aware delta prefetching may be described herein with references to particular sizes of such memory structures, it should be noted that the region aware delta prefetching may be adapted to any cache line size, memory region size, and subregion size according to particular needs and implementations.

In one or more embodiments, region aware delta prefetcher 110 may be configured in hardware and may be provisioned in each core. In one example, region aware delta prefetcher 110 may be configured with prefetch circuitry and circuit-based memory (also referred to herein as "memory circuitry") using appropriate data structures for storing and obtaining metadata and/or other information related to cache lines accessed by a program and prefetches of cache lines accessed by the program. Prefetches may be performed in L1 cache 122, and therefore, region aware delta prefetcher 110 and L1 cache 122 may be co-located in core 104. In other embodiments, prefetches may be performed in other caches (e.g., L2, L3, L0, etc.). In other embodiments, however, any suitable combination of hardware, firmware, and software may be used to implement region aware delta prefetching as described herein.

A subregion buffer 114 may be configured to hold subregion buffer entries that are generated and inserted upon detection of a memory access to a subregion that does not correspond to any of the existing subregion buffer entries in the subregion buffer 114, either because the program has not yet accessed that subregion or because the subregion was previously accessed and its subregion buffer entry was evicted. Subregion buffer entries track the data cache unit (e.g., L1 cache 122) accesses over a temporal window. For a given subregion buffer entry, multiple delta values may be calculated and stored therein based on consecutive memory accesses to different cache lines within the associated subregion. It should be noted that, even if intervening memory accesses are performed to different subregions, delta values can be calculated between consecutive accesses with the same subregion. In one or more embodiments, each subregion buffer entry may store up to 16 delta values. When a memory access is determined to have a corresponding subregion buffer entry, data may be prefetched into L1 cache 122. The memory address of the data to be prefetched may be determined using selected delta values from the subregion buffer entry.

In a region aware delta prefetcher 110, a delta value represents the distance from one cache line to another cache line within a subregion. Moreover, each delta value may be a positive or negative value. For example, a delta value of +2 indicates a distance of two cache lines forward in linear memory. A delta value of −5 indicates a distance of 5 cache lines backward in linear memory. In one possible optimization, delta values may be limited to a selected delta value range to save storage area without significant loss in coverage when prefetching. In at least one embodiment, the delta value range could be ±32.

Pattern table 116 may be another structure of region aware delta prefetcher 110 in one or more embodiments. Pattern table 116 tracks the learned delta information per memory region. In one or more embodiments, pattern table 116 is updated each time an entry in the subregion buffer 114 is evicted. This may occur, for example, when the subregion buffer 114 is full and one (or more) of the subregion buffer entries is selected for eviction. In one example, an entry may be selected for eviction according to a least-recently-used approach. Thus, when a particular subregion has not been accessed by the program and, therefore, the corresponding subregion buffer entry in subregion buffer 114 has not been updated, then the temporal window for that subregion closes and the subregion buffer entry may be evicted.

In one or more embodiments, a pattern table may be configured and organized in any suitable arrangement to store information pertaining to each memory region associated with an executing program. In one example, pattern table 116 may include 256 entries, each corresponding to a memory region. A region entry may store delta values that were learned in subregion buffer 114. In one example, a region entry may store five of the most frequently observed delta values for the region.

In one or more embodiments, subregion buffer 114 and pattern table 116 may be provided in any suitable circuit-based memory including, but not necessarily limited to, processor cache, N-way set associative cache, content-addressable memory (CAM), and/or static random access memory (SRAM). In other implementations, subregion buffer 114 and/or pattern table 116 may be provided in other types of memory or storage such as lower level cache or main memory. Additionally, subregion buffer 114 and pattern table 116 may each be configured as any suitable one or more data structures, which may be discrete or combined, including but not limited to a table, index, list, array, database, register, N-way set-associative table, or linked-list. While subregion buffer 114 and pattern table 116 are illustrated as separate entities, it should be appreciated that this is for illustration purposes and that these entities may be combined or separated, in whole or in part, in any suitable arrangement based on particular needs and implementations.

Figure 2:
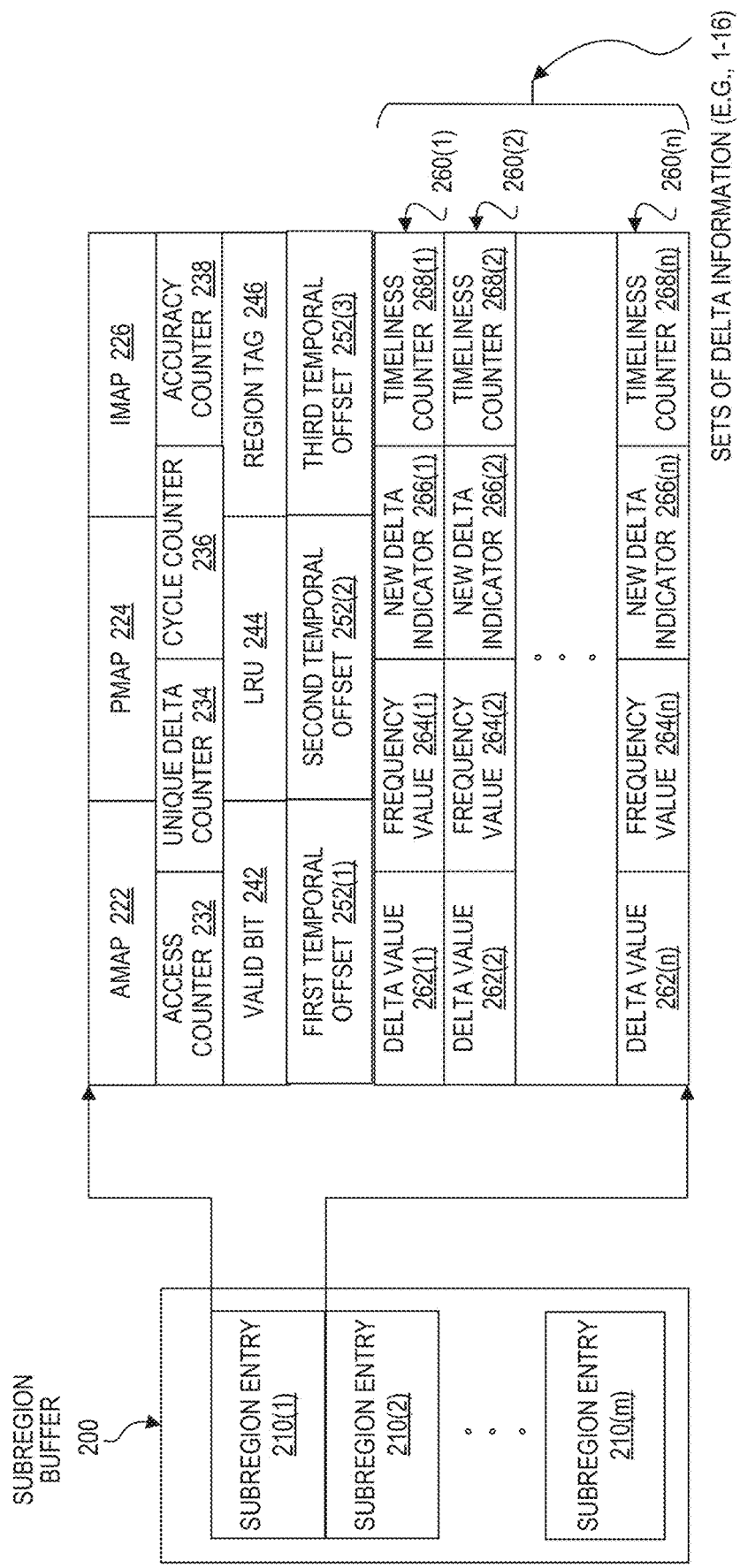
FIG. 2 is a block diagram illustrating details of a subregion buffer associated with region aware delta prefetching according to at least one embodiment.

FIG. 2 is a block diagram illustrating possible details of a subregion buffer 200 that may be used to implement region aware delta prefetching according to at least one embodiment. Subregion buffer 200 is one example configuration of subregion buffer 114 of region aware delta prefetcher 110 in FIG. 1. Subregion buffer 200 may support prefetching for a single program that is executing. In other embodiments, subregion buffer 200 may support more than one executing program. For ease of description, the embodiments are described herein with references to a single executing program.

Subregion buffer 200 includes multiple subregion entries 210(1)-210(m), and each subregion entry corresponds to a respective subregion within one of multiple memory regions allocated to a program. The memory regions (and thus, the subregions within the memory regions) may be defined in linear address space. In one example, subregions corresponding to subregion entries 210(1)-210(m) may be 8 KB, and the memory regions in which they reside may be 32 KB. In one possible configuration, subregion buffer 200 may include thirty-two subregion entries 210(1)-210(32). Thus, when subregion buffer 200 is full, one or more of the subregion entries are evicted when a new entry or entries are generated based on a new memory access.

Each subregion entry may contain metadata and/or information related to cache lines in the subregion corresponding to the entry that are accessed by a program, as illustrated for one example subregion entry 210(1). Other subregion entries in subregion buffer 200 may have the same configuration. Subregion entry 210(1) can include an access map (AMAP) 222, a prefetch map (PMAP) 224, an issue map (IMAP) 226, an access counter 232, a unique deltas counter 234, a cycle counter 236, a valid bit 242, least recently used information 244, a region tag 246, three temporal offsets 252(1)-252(3), and a predefined number of delta information sets 260(1)-260(n) for observed and tracked deltas. In one or more implementations, the predefined number of delta information sets 260(1)-260(n) is sixteen. Thus, in this implementation, up to sixteen delta values and related information can be tracked for memory accesses to the subregion during a temporal window (e.g., period of execution during which the subregion entry is stored in the subregion buffer 200).

With reference to specific metadata in subregion entry 210(1), the AMAP 222 (access map) may comprise a bit vector with each bit representing a respective cache line in the subregion, and the value (e.g., 0 or 1) of that bit indicates whether a memory access has been detected for the respective cacheline during the current temporal window. For 8 KB subregions in which 64B cache lines are stored, a subregion contains 128 cache lines. Accordingly, AMAP 222 may be a 128-bit vector. When a memory access is detected, the corresponding bit in AMAP 222 may be set.

The PMAP 224 (prefetch map) may comprise a bit vector with each bit also representing a respective cache line in the subregion, and the value (e.g., 0 or 1) of that bit indicates whether the respective cacheline is a candidate for prefetch. Thus, PMAP 224 may be a 128-bit vector when the subregion corresponding to the subregion entry 210(1) is 8 KB. Candidates for prefetch can be identified when a memory access to a new cache line in a subregion that corresponds to an existing subregion entry is detected. In this scenario, prefetch candidates (i.e., linear address of cache lines in the subregion) can be identified based on the most frequently occurring deltas in the subregion entry, and the bits in the PMAP that correspond to the identified cache lines can be set.

The IMAP 226 (issue map) may comprise a bit vector with each bit also representing a respective cache line in the subregion, and the value (e.g., 0 or 1) of that bit indicates whether a prefetch request has been generated for the respective cache line. Thus, IMAP 226 may be a 128-bit vector when the subregion corresponding to the subregion entry 210(1) is 8 KB. In some embodiments, the candidates for prefetch indicated in PMAP 224 may be reduced to a selected subset of candidates and the selected subset of candidates are issued. This helps prevent prefetching more than the system can handle.

Several counters may also be provided in subregion entries. Access counter 232 may contain a running count of the number of memory accesses to the subregion corresponding to subregion entry 210(1) that have been detected during the current temporal window. The unique deltas counter 234 may be a running count of the number of unique deltas observed and calculated. The unique deltas counter 234 may correspond to the number of sets of delta information 260(1)-260(n) stored in the subregion entry 210(1). Cycle counter 236 may include a value that is updated after each execution cycle to indicate the number of execution cycles that have expired since the latest memory access to the subregion corresponding to subregion entry 210(1) was detected.

Other information in subregion entry 210(1) can include a valid bit 242. The valid bit can indicate whether the region buffer entry holds valid data. If the data is invalid, then the region buffer entry can be made first available for replacement. Thus, the valid bit can also be used to reset entries faster. In at least one implementation, subregion buffer 200 may be managed according to a least recently used (LRU) technique. In this case, when the subregion buffer 200 is full, and a memory access to a previously dormant subregion is detected, the least recently used subregion entry in subregion buffer 200 can be evicted to make room for a new subregion entry to correspond to the dormant subregion being accessed. As used herein, "dormant subregion" is intended to mean a subregion of a memory region allocated to a program where the subregion is not currently being accessed by the program but is capable of being accessed by the program. Subregion entry 210(1) may contain an LRU information 244 that indicates how recent the subregion corresponding to subregion entry 210(1) was accessed relative to the subregions corresponding to other subregion entries 210(2)-210(m).

A region tag 246 may also be included in the subregion entry 210(1) to identify the memory region to which the subregion belongs. The region tag 246 (or another tag) can also indicate which subregion is associated with the subregion entry 210(1). This may be needed when searching subregion buffer 200 to determine whether an existing subregion entry corresponds to a subregion targeted by a memory access.

Subregion entry 210(1) may further include any suitable values that can be used to indicate or determine the location of a predetermined number of previously-accessed cache lines in the subregion relative to the other cache lines in the subregion. The previously accessed cache lines correspond to the most recent consecutive accesses to the subregion.

In one or more embodiments, the predetermined number is three, although the number could be more or less depending on particular needs and implementations. One option, which also minimizes storage, is to use the bit-vector access map (e.g., AMAP 222) and store, in subregion entry 210(1), offsets to bits representing the previously accessed cache lines. The offsets may be based on the beginning or end of the bit vector, for example, Accordingly, in this implementation, subregion entry 210(1) can include three temporal offsets 252(1)-252(3) (or any other suitable number of temporal offsets). Temporal offsets 252(1)-252(3) can be used to identify the latest three cache lines that were accessed in the subregion during the current temporal window for the subregion (e.g., since subregion entry 210(1) was inserted in subregion buffer 200). An example use of temporal offsets with an access map to identify previously-accessed cache lines will be further explained with reference to FIG. 3.

Subregion entry 210(1) also includes one or more sets of delta information 260(1)-260(n). Each set of delta information is specific to a temporal window for the subregion corresponding to subregion entry 210(1). Each set of delta information is either obtained from previously learned information stored in the pattern table, or generated based on accesses to the subregion during the temporal window. A temporal window is defined per subregion and may be a current (or prior) period of program execution when a subregion entry is present (e.g., inserted and not evicted) in subregion buffer 200. Because multiple subregion entries can be present in subregion buffer 200 simultaneously, temporal windows for different subregions may overlap.

A set of delta information may include a delta value, such as delta values 262(1)-262(n). Generally, a delta value can be any suitable value that represents the distance between two cache lines. In one or more embodiments, delta values 262(1)-262(n) can represent the distance between a new cache line accessed in a subregion and another cache line in one of (up to) three prior consecutive cache line accesses within the same subregion. In some scenarios, one or more delta values learned from program accesses to the subregion or other subregions of the same memory region during a prior temporal window(s) may be obtained from another table (e.g., pattern table 116) and stored in respective sets of delta information 260(1)-260(n). In some scenarios, delta values may also (or alternatively if no learned values exist) be determined for each of three possible deltas by calculating the difference (or distance) between the new cache line and each of the three cache lines, which may be identified by the temporal offsets 252(1)-252(3) in subregion entry 210(1), as will be further described herein at least with respect to FIG. 3. Each set of delta information 260(1)-260(n) includes a frequency value 264(1)-264(n), which can be incremented each time the delta value 262(1)-262(n) in the set is observed during a temporal window for the subregion based on memory accesses to the subregion.

A set may also include a new delta indicator 266(1)-266(n) that indicates the delta is new (e.g., was not found in a prior temporal window). The set may further include a timeliness counter 268(1)-268-(n) that indicates how many execution cycles have expired since the last time the delta value in the set was observed. This can be used to determine whether to evict one of the sets if the maximum number of sets are stored in the subregion entry 210(1) and one or more new deltas have been observed and could be added as one or more new sets of delta information.

Figure 3:
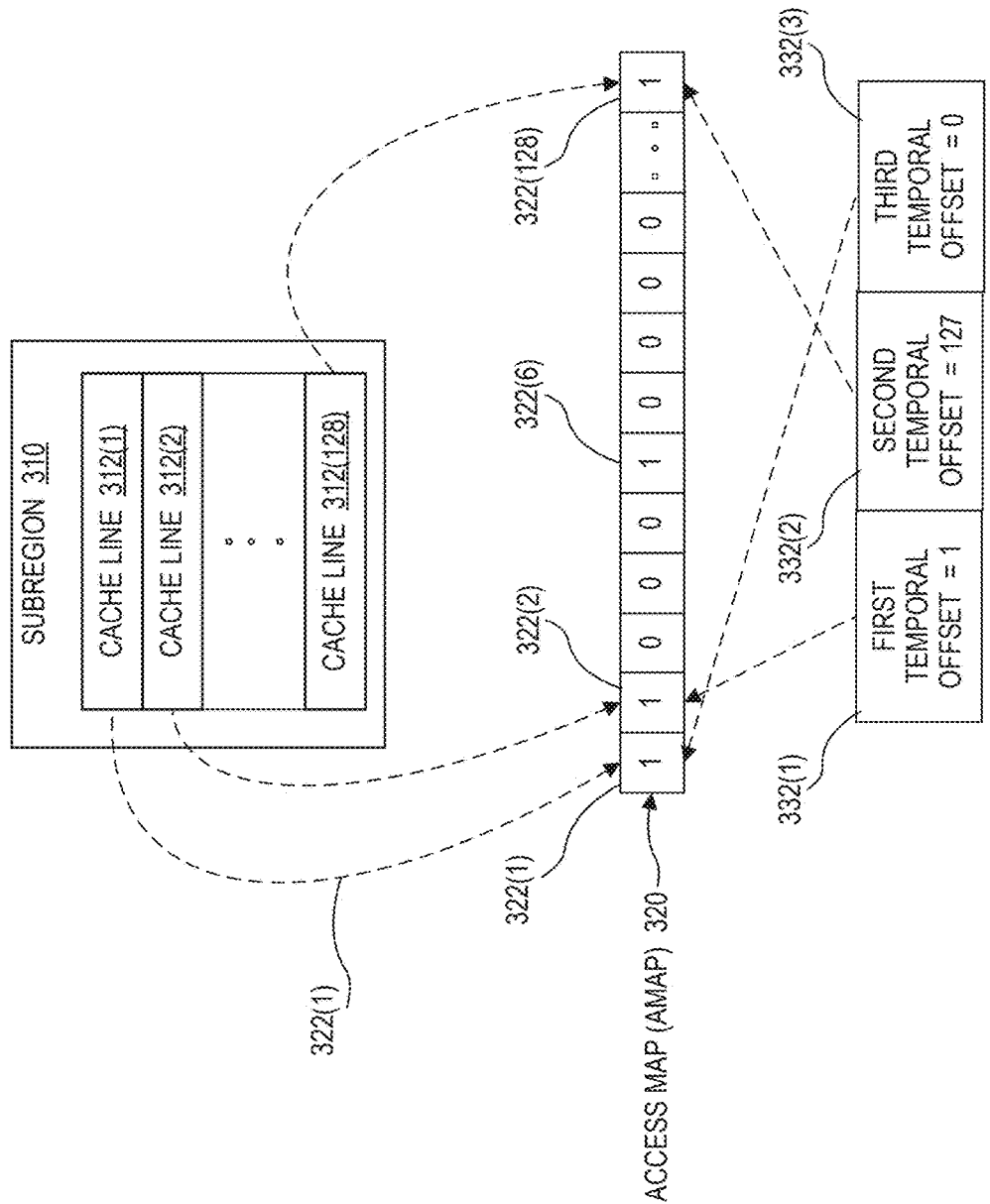
FIG. 3 is a block diagram illustrating an example of metadata that may be used in region aware delta prefetching according to at least one embodiment.

FIG. 3 is a block diagram illustrating an example scenario of selected metadata from a subregion entry (e.g., 210) for region aware delta prefetching. In particular, FIG. 3 illustrates an access map for a subregion that may be used in region aware delta prefetching according to one or more embodiments. In this example, an 8-kilobyte subregion 310 is illustrated with 128 64-byte cache lines 312(1)-312(128). An access map 320 (e.g., similar to access map 222 of FIG. 2) may be provided as a 128-bit vector to represent 8-kilobyte subregion 310. Each cache line is represented by a different bit in the bit vector. For example, cache line 312(1) is represented by the most significant bit 321(1), cache line 312(2) is represented by the second most significant bit 321(2), etc. The last cache line 312(128) in the subregion is represented by the least significant bit 321(128). It should be apparent that this is just one example implementation, and that any other suitable arrangement (e.g., bit order, etc.), in addition to any other sizes of the subregion, cache lines, and access map may be used depending on particular needs and implementations.

FIG. 3 also illustrates examples of a first temporal offset 332(1), a second prior temporal offset 332(2), and a third temporal offset 332(3). Each temporal offset for a 64-byte cache line that is accessed in an 8-kilobyte subregion may have a value of 0-127 since the 8-kilobyte subregion can hold 128 64-byte cache lines. A temporal offset can be used to locate a bit in the 128-bit vector access map 320, and the located bit represents a particular cache line. For example, the first temporal offset 332(1) having a value of 1 maps to bit 322(2), which represents cache line 312(2). The second temporal offset 332(2) having a value of 127 maps to bit 322(128), which represents cache line 312(128). The third temporal offset 332(3) having a value of 0 maps to bit 322(1), which represents cache line 312(1).

In at least one embodiment, when a current memory access has been detected in a subregion during a temporal window for the subregion, up to three cache lines represented by bits in an access map can be located using temporal offsets in a subregion entry. The three cache lines are the latest three cache lines to be accessed in the subregion (but not necessarily the latest cache lines to be accessed across the entire memory region) relative to the current memory access. For example, in FIG. 3, the first temporal offset 332(1) may be used to identify the last cache line accessed in the subregion prior to the current memory access and during the current temporal window, the second temporal offset 332(2) may be used to identify the second-to-last accessed cache line in the subregion, and the third temporal offset 332(3) may be used to identify the third-to-last accessed cache line in the subregion. Thus, the first prior memory access of cacheline 312(2) consecutively precedes the current memory access that has occurred in subregion 310, such that no intervening memory accesses occurred in subregion 310 between the first prior memory access and the current memory access. The second prior memory access of cacheline 312(128) consecutively precedes the first prior memory access of cacheline 312(2), such that no intervening accesses occurred in subregion 310 between the first prior memory access and the second prior memory access. Further, the third prior memory access of cacheline 312(1)

consecutively precedes the second prior memory access of cacheline 312(128), such that no intervening accesses occurred in subregion 310 between the third prior memory access and the second prior memory access.

As additional memory accesses are made by a program, temporal offsets in a subregion entry are shifted to reflect the new accesses. For example, in FIG. 3, if a new cacheline in subregion 310, represented by a sixth most significant bit 322(6), is accessed by the program, then bit 322(6) is set to reflect the access. After the delta values for the cacheline are calculated, the temporal offset values are shifted and the temporal offset of the new cacheline is inserted. Thus, in this example, the third temporal offset 332(3) is updated with a value of 127, the second temporal offset 332(2) is updated with a value of 1, and the first temporal offset 332(1) is updated with a value of 6. In other embodiments, greater or fewer temporal offsets may be stored in subregion entries of subregion buffer 200. Generally, any suitable number of offsets may be used based on particular needs, architecture, and implementation.

Figure 4:
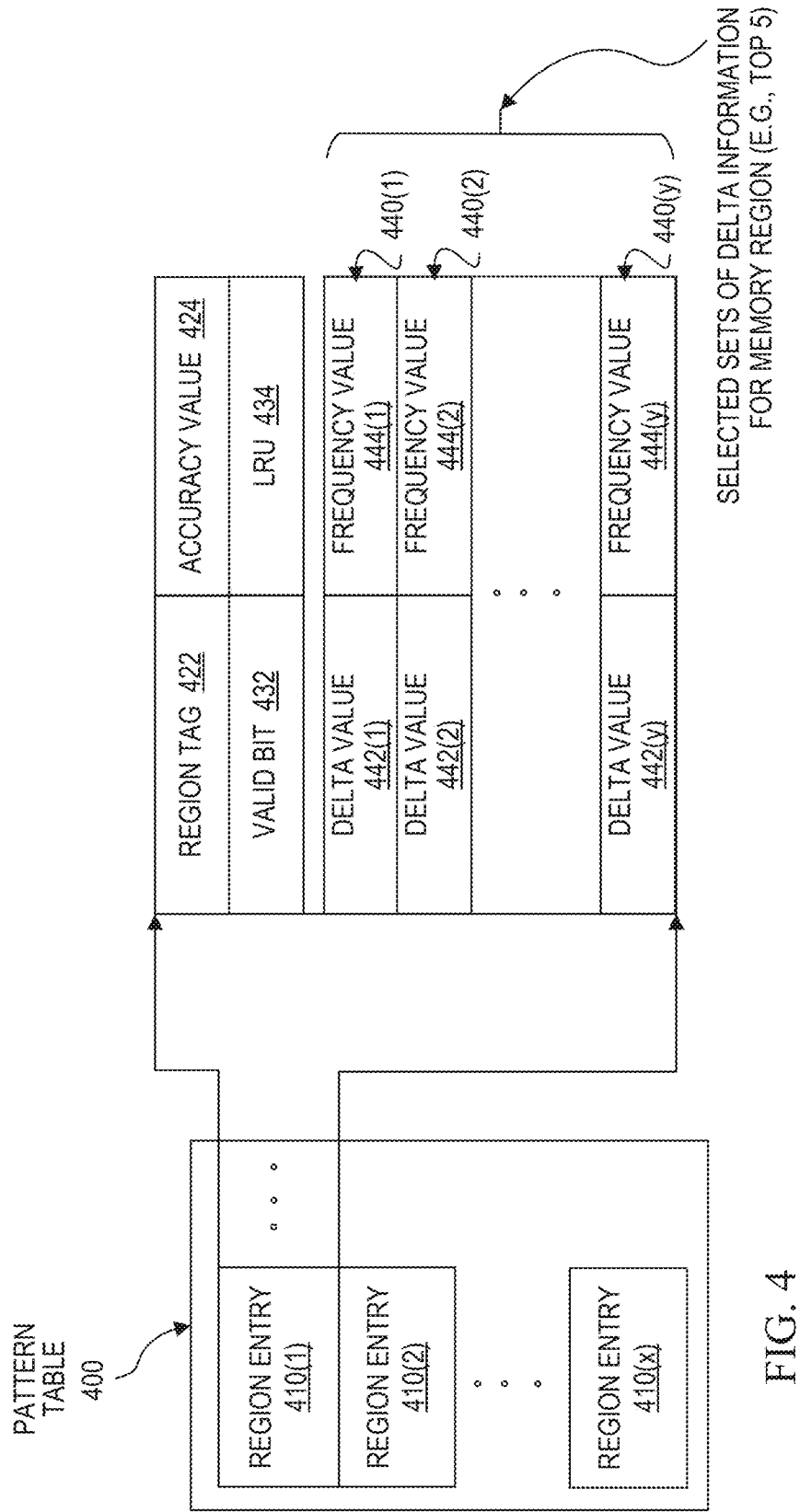
FIG. 4 is a block diagram illustrating details of a pattern table associated with region aware delta prefetching according to at least one embodiment.

FIG. 4 is a block diagram illustrating possible details of a pattern table 400 that may be used to implement region aware delta prefetching according to at least one embodiment. Pattern table 400 is one example configuration of pattern table 116 of region aware delta prefetcher 110 in FIG. 1. Pattern table 400 may support prefetching for a single program that is executing. In other embodiments, pattern table 400 may support more than one executing program. For ease of description, the embodiments are described herein with references to a single executing program.

Pattern table 400 includes multiple memory region entries 410(1)-410(x), and each region entry corresponds to a respective memory region allocated to a program. The memory regions may be defined in linear address space. Each memory region entry 410(1)-410(x) holds information related to one memory region. In one example, memory regions corresponding to region entries 410(1)-410(x) may be 32 KB, and pattern table may hold 256 entries corresponding to 256 42 KB memory regions, respectively. Optionally, pattern table 400 may be organized as set-associative storage with 64 sets and 4 ways (64×4). It should be appreciated that any suitable data structure may be used to hold information related to the memory regions. When pattern table 400 is full, one or more of the memory region entries may be evicted when a new memory region entry is generated. This could occur, for example, when a new memory region is accessed, a subregion entry is inserted into a subregion buffer (e.g., 114, 200), and then the subregion entry is evicted. Accordingly, a new memory region entry may be created and added to pattern table 400. Subsequent evictions of subregion entries from the subregion buffer may simply update the memory region entry to which it corresponds.

Each memory region entry 410(1)-410(x) may contain learned information related to memory accesses within the memory region corresponding to the memory region entry, as illustrated for one example memory region entry 410(1). Other memory region entries in pattern table 400 may have the same configuration. A particular memory region entry, such as memory region entry 410(1), is updated with information related to memory accesses to the corresponding memory region each time a temporal window expires for a subregion of the memory region. For example, each time a subregion entry is evicted from a subregion buffer (e.g., subregion buffers 114, 200), a memory region entry, which corresponds to a memory region in which the subregion of the evicted subregion entry belongs, is updated with the information learned while the subregion entry was in the subregion buffer.

Memory region entry 410(1) includes a region tag 422, an accuracy value 424, a valid bit 242, least recently used (LRU) information 434, and a predefined number of selected delta information sets 440(1)-440(y) for learned deltas. In one or more implementations, the predefined number of selected delta information sets 440(1)-440(y) is five. Thus, in this implementation, five delta values and related information that are learned in the subregion buffer (e.g., subregion buffer 114, 200) during one or more temporal windows for one or more of the subregions of the memory region can be used to populate and/or update five selected delta information sets 440(1)-440(5).

With reference to specific metadata in memory region entry 410(1), a region tag 422 may be included in memory region entry 410(1) to identify the memory region corresponding to the memory region entry 410(1). An accuracy value 424 may also be included to indicate the accuracy rate or percentage of successful prefetches in the memory region. Memory region entry 410(1) may also include a valid bit 432.

In at least one implementation, pattern table 400 may be managed according to a least recently used (LRU) technique. In this case, when the pattern table is full one or more of the memory region entries may be evicted when a new memory region entry is generated. This could occur, for example, when a new memory region is accessed by the program (e.g., read or write access), a subregion entry is inserted into a subregion buffer (e.g., 114, 200), and then subsequently, the subregion entry is evicted. Accordingly, a new memory region entry may be generated based on the learned information from the evicted subregion entry and added to pattern table 400. Subsequent evictions of subregion entries (e.g., subregion entries 210(1)-210(m)) from the subregion buffer (e.g., subregion buffer 200) may simply update the memory region entry to which it corresponds. Accordingly, memory region entry 410(1) may contain LRU information 434 that indicates how recent the memory region entry 410(1) was updated with learned information from an evicted subregion entry.

Memory region entry 410(1) also includes one or more sets of selected delta information 440(1)-440(y). Each set of selected delta information is added or updated upon the eviction of a subregion entry for a subregion that belongs to the memory region corresponding to the memory region entry 410(1). In at least one embodiment, one or more delta values and associated frequency values can be selected from the evicted subregion entry to update sets of delta information 440(1)-440(y) in the memory region entry 410(1) based on which delta values tracked in the evicted subregion entry have the highest frequency at the end of the temporal window. The frequency with which each delta value occurs can be tracked by a respective frequency value (e.g., frequency values 264(1)-264(n)) mapped to each delta value. The number of delta values that are selected may be limited by the maximum number of delta values that can be tracked and stored in memory region entry 410(1). In one example, a maximum of five delta values may be selected from the evicted subregion entry and stored in the memory region entry 410(1). The delta values tracked in the evicted subregion entry may be sorted based on frequency, and the five highest frequency delta values can be selected. The selected delta values and their corresponding frequency values (e.g., delta values 262(1)-262(5) and frequency values 264(1)-264(5)) may be stored in the memory region entry 410(1) in the selected delta information sets 440(1)-440(y). They may replace existing sets or be added as new sets if the memory region entry 410(1) does not hold the maximum number of sets (e.g., 5 sets in one example).

Embodiments of a RAD prefetcher offer a significant advantage by having extremely low storage requirements. In one example implementation, RAD prefetcher 110 can be configured to use only 4.32 KB of storage. The fields of subregion buffer 200 and pattern table 400 can be configured to enable the low storage requirements. For example, in pattern table 400, pattern storage=(5 deltas*(3+6=9)bits+9-bit tag+5-bit region info) (64*4)=1888 Bytes (or 1.85 KB). In subregion buffer 200, subregion buffer storage=(3*128 bits+16 bit tag+19 bit(region metadata)+(7*3 offsets)+(16 deltas*12 bits)*32=2528 Bytes (or 2.47 KB). This nonlimiting example illustrates one possible implementation that results in extremely low storage requirements. It should be appreciated that numerous other field sizes and storage configurations may be used to implement the broad concepts herein.

Figure 5:
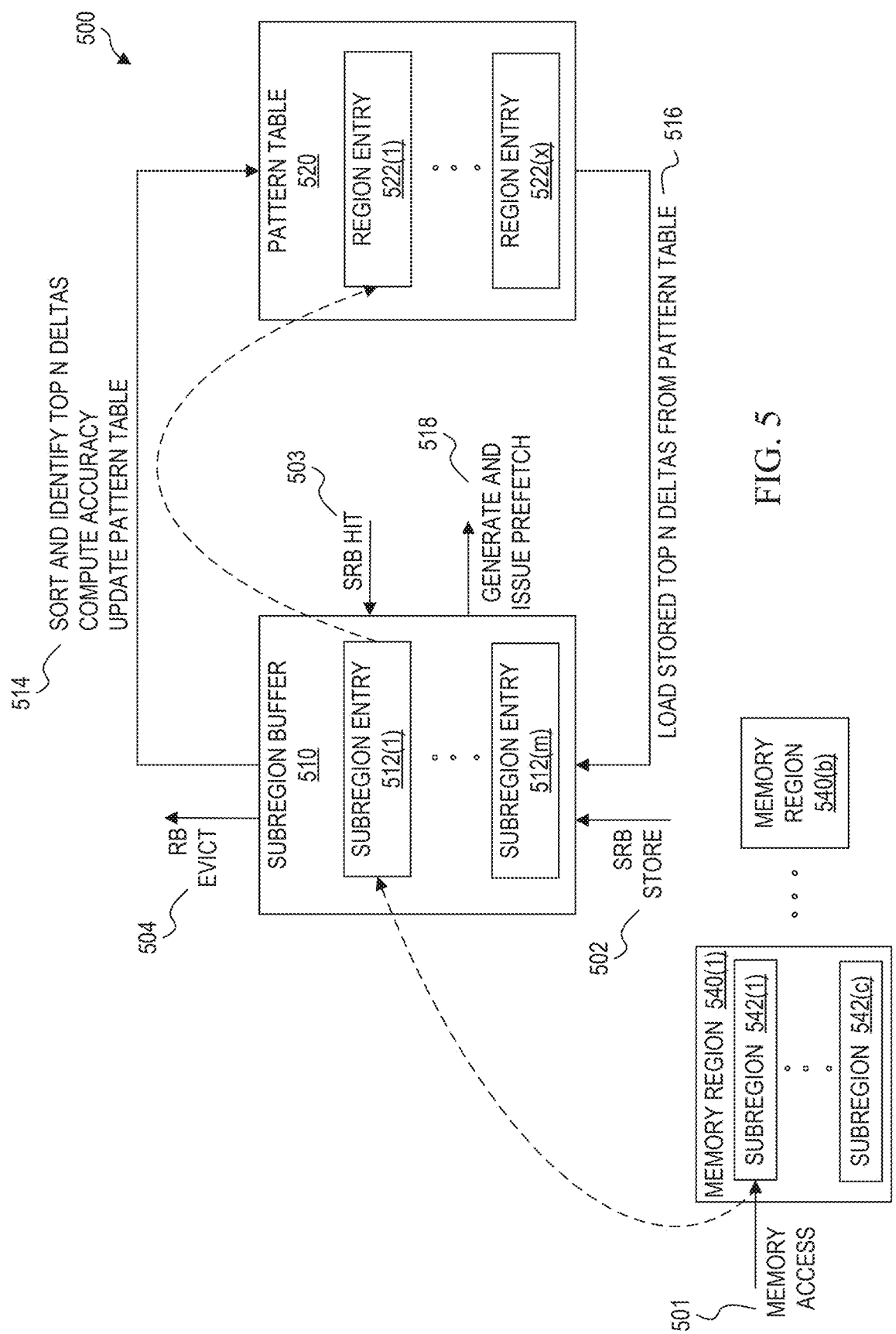
FIG. 5 is a block diagram illustrating a flow of operations in a region aware delta (RAD) prefetcher according to at least one embodiment.

Turning to FIG. 5, FIG. 5 is a block diagram illustrating a possible interaction flow in a region aware delta (RAD) prefetcher 500. Region aware delta prefetcher 500 may have the same or similar configuration and functionality as shown and described with reference to region aware delta prefetcher 110 in FIG. 1. Subregion buffer 510 may have the same or similar configuration and functionality as shown and described with reference to subregion buffers 114 and 200 in FIGS. 1 and 2. Pattern table 520 may have the same or similar configuration and functionality as shown and described with reference to pattern tables 116 and 400 in FIGS. 1 and 4. An example interaction flow between subregion buffer 510 and pattern table 520 during a program execution will now be described. At least some of the interactions may be performed or facilitated by prefetch circuitry of region aware delta prefetcher 500, which may be the same or similar to prefetch circuitry 112 and may be separate from or integrated with subregion buffer 510 and/or pattern table 520.

In the example of FIG. 5, subregion buffer 510 includes subregion entries 512(1)-512(m). The number of subregion entries may be limited to a maximum (e.g., 32), but the number and contents of existing subregion entries at any given time depends on the execution of the program. In addition, pattern table 520 includes region entries 522(1)-522(x). The number of region entries may be limited to a maximum (e.g., 256), but the number and contents of existing region entries at any given time depends on the execution of the program.

Operations and/or interactions may occur upon each memory access by an executing program. For example, a read operation, a write operation, or any variation thereof (collectively referred to herein as "memory access") to access memory in a memory region allocated to the program. For clarity, memory regions 540(1)-540(b) are illustrated in FIG. 5 and represent memory regions that have been allocated to an executing program. Memory region 540(1) contains subregions 542(1)-542(c), and the flow of operations in FIG. 5 are described with reference to memory accesses made by an executing program to subregions 542(1)-542(c) of memory region 540(1).

Initially, a new memory access 501 to new subregion 542(1) of memory region 540(1) is detected by RAD prefetcher 500 (e.g., prefetch circuitry). In one example, RAD prefetcher 500 is invoked as part of a data cache unit pipeline and tracks data cache unit (e.g., L1 cache) accesses. Generally, a cache miss is an event in which a program requests data from a cache, but the particular data that is requested is not present in the cache. However, any other suitable approach for detecting a memory access of a new cache line that has not previously been accessed by a program, or that has previously been accessed by the program but is no longer stored in L1 cache, may be used in one or more embodiments. The memory access 501 could be the first memory access that the program has made to subregion 542(1). Alternatively, the memory access 501 could be the first memory access that the program has made to subregion 542(1) since a previous subregion entry for subregion 542(1) was evicted from subregion buffer 510.

Detecting a new memory access to a subregion (e.g., by a data cache unit miss), and determining that the subregion buffer (SRB) 510 is missing a subregion entry for the subregion targeted by the new memory access, can trigger the RAD prefetcher to insert (e.g., store, copy, write, etc.) a new subregion entry into subregion buffer 510, as indicated at 502. Subregion entry 512(1) can be populated with information related to subregion 542(1). For example, a region tag (e.g., region tag 246) may be added to subregion entry 512(1) to identify the memory region 540(1) to which subregion 542(1) belongs. A subregion tag may also be added to subregion entry 512(1) to identify subregion 542(1). In some cases, the region tag and the subregion tag may be combined.

Subregion entry 512(1) may also be populated with information related to delta values calculated for memory accesses that occur while subregion entry 512(1) is present in subregion buffer 510. Subregion entry 512(1) may further be populated with information stored in a region entry 522(1) of pattern table 520 related to learned delta values having the highest frequency of occurrence for memory accesses within the memory region 540(1). In this scenario, region entry 522(1) could have previously been updated with learned information of frequently occurring delta values and their frequency and accuracy for cache lines of memory accesses in memory region 540(1). The RAD prefetcher may look up region entry 522(1) using a 32 KB aligned address to copy over any existing learned information on the most frequently occurring delta values and the accuracy of those delta values. In one or more embodiments, region entry 522(1) may contain up to a maximum number N (e.g., N=5) of the most frequently occurring delta values in memory region 540(1), and a respective frequency value for each delta value. Accordingly, the one or more delta values (e.g., delta values 442(1)-442(y)) and their respective one or more frequency values (e.g., frequency values 444(1)-444(y)), along with the accuracy value (e.g., accuracy value 424) can be copied over to corresponding fields in subregion entry 512(1).

In at least some embodiments, optionally, delta values learned in one subregion (e.g., 8K subregion) can be applied to a larger memory region (e.g., 32 KB region). The spatial similarity can be exploited to accelerate learning to achieve higher coverage and reduce storage requirements, since delta values only need to be observed per subregion. Thus, even if the delta values and respective frequency values were learned from accesses to other subregions, the access patterns in the other subregions of the same memory region may be similar. Applying this optional feature to the embodiment shown in FIG. 5, one or more of the learned delta values in region entry 522(1) may have been learned during temporal windows of any of the subregions 542(1)-542(c). In this scenario, for example, the delta values learned from any of subregions 542(2)-542(c) may be used in prefetches in subregion 542(1).

Other information in subregion entry 512(1) can be updated or cleared as appropriate. For example, an access map (e.g., AMAP 222) in subregion entry 512(1) may be updated to indicate which cache line in subregion 542(1) is accessed in response to memory access 501. A prefetch map (e.g., PMAP 224) may be updated with indications of prefetch candidates based on delta values in subregion entry 512(1), some or all of which could have been populated in subregion entry 512(1) from region entry 522(1). An issue map (e.g., IMAP 226) may be populated with indications of which prefetch requests were generated from the prefetch candidates identified in the prefetch map.

Counters in subregion entry 512(1) may also be appropriately updated or cleared. For example, an access counter (e.g., access counter 232) may be updated to indicate one access (e.g., the access that prompted the subregion entry insertion) and, as further memory access are detected in subregion 542(1), the access counter can be appropriately incremented. A deltas counter (e.g., unique deltas counter 234) may be updated with the number of delta values copied from region entry 522(1) into subregion entry 512(1). A cycle counter (e.g., cycle counter 236) may be cleared initially, and then incremented at the end of each execution cycle. Additionally, a valid bit (e.g., valid bit 242) may be set, and an LRU value (e.g., LRU information 244) may be stored to indicate that subregion entry 512(1) was most recently used. Also, offset values indicating the three prior consecutive temporal offsets may be cleared and one offset value may be updated to indicate the cache line accessed by memory access 501, which may be used to calculate a delta value once a new cache line is accessed. The other temporal offsets would be updated with each further memory access.

Storing subregion entry 512(1) in subregion buffer 510 begins a temporal window for subregion 542(1). During the temporal window, memory accesses to subregion 542(1) are tracked in subregion buffer 510 and access deltas are observed based on the memory accesses by the program. In at least one embodiment, the accesses are observed at the innermost L1 cache (e.g., L1 cache 122). In at least one implementation, 32 entries can be stored in subregion buffer 510, and up to 16 delta values observed within subregion 542(1) (and/or obtained from region entry 522(1)) may be tracked in subregion entry 512(1).

Once subregion entry 512(1) is stored in subregion buffer 510 (and the temporal window begins) further accesses to subregion 542(1) may result in a subregion buffer "hit". A subregion buffer hit 503 occurs when a memory access to a new cache line in subregion 542(1), which has not previously been accessed during the current temporal window, is detected. In at least one embodiment, a cache line accessed by a memory access may be determined to be new based on the access map in subregion entry 512(1). If the bit in the bit vector of the access map that represents the cache line being accessed is not set, then a subregion hit has occurred because the cache line has not previously been accessed during the current temporal window.

Each detected subregion buffer hit, when access to a new cache line is detected, can trigger a prefetch generation and issue. Prefetch candidates are to be generated based on new cache lines touched within the subregion using a predetermined number of the most frequently occurring delta values being tracked in the subregion entry. Thus, in the example of FIG. 5, a predetermined number (e.g., 5) of most frequently occurring delta values being tracked in subregion entry 512(1) may be used to generate prefetch candidates. For example, a bit location for the bit in the access map that represents the new cache line can be determined. A selected delta value may be added to the bit location to identify another bit in the access map that is appropriately distanced (e.g., by the delta value) from the bit representing the new cache line. The identified bit represents a cache line that is a prefetch candidate. Each of the other selected delta values may be used to identify prefetch candidates based on the access map. In at least one embodiment, prefetch requests may be generated based on one or more of the prefetch candidates.

In one or more embodiments, the predetermined number of most frequently occurring delta values to be used in prefetch generation and issue is five. However, it should be apparent that embodiments may use a greater or lesser predetermined number based on particular needs and implementations.

When subregion entry 512(1) is initially stored in subregion buffer 510, the predetermined number of most frequently occurring delta values in subregion entry 512(1) may be populated by the selected delta values stored in the corresponding region entry 522(1) for memory region 540(1). However, other delta values may be learned during the temporal window as delta values are tracked in subregion entry 512(1). For example, if subregion entry 512(1) tracks a total of sixteen delta values, and if five delta values and corresponding frequency values from region entry 522(1) are used to initially populate subregion entry 512(1), then during the temporal window, an additional eleven new delta values for memory accesses to subregion 542(1) may be tracked in subregion entry 512(1).

In addition to triggering prefetch generation, each detected access of a new cache line (a subregion buffer hit) in subregion 542(1) during a temporal window of subregion 542(1), triggers the calculation of at least one delta value. A delta value may be calculated based on the location of the cache line targeted in the detected access and the location of a cache line of a prior consecutive access by the program to the same subregion. Multiple delta values may be calculated if multiple prior consecutive memory accesses have occurred in subregion 542(1). In one or more embodiments, three delta values may be calculated when a new cacheline in subregion 542(1) is accessed if at least three prior accesses to the new subregion have occurred.

In one example scenario, three temporal offsets (or any other suitable number of temporal offsets) that can be used to identify the three most recently accessed cache lines in subregion 542(1) in an access map of the subregion entry 512(1), may be stored in subregion entry 512(1) as, for example, temporal offsets 252(1)-252(3). Accordingly, when a subsequent access to the subregion 542(1) is detected, the access map in subregion entry 512(1) can be updated to identify the cache line targeted by the subsequent access. A delta value can be calculated based on the difference between an offset to the bit in the access map identifying the cache line of the subsequent access and the first offset stored in subregion entry 512(1). Thus, if the offset to the bit representing the cache line targeted by the subsequent access is 20, and if the first offset is 5, then the delta is +15 (i.e., 20−5=15). In one possible optimization, the delta values may be limited to a selected number without significant loss in coverage. For example, in the implementation of 32 KB memory regions, 8 KB subregions, and 64B cache lines, delta values may be limited to plus or minus (±) 32.

In one or more embodiments, subregion buffer 510 holds a maximum number of subregion entries, m. In one possible scenario, the maximum number of subregion entries for an 8-kilobyte subregion in a 32-kilobyte memory region and storing 64-byte cache lines, the maximum number of subregion entries may be m=32. If subregion buffer 510 fills up with the maximum number of subregion entries, and access to a new, previously unseen cache line is detected, then one of the existing subregion entries may be evicted to make room for a new subregion entry corresponding to the new cache line. In one example, the least recently used subregion entry may be evicted. This may be determined based on a least recently used metadata field (e.g., 244) in each subregion entry. The LRU value may indicate which subregion entry has been accessed the least, and therefore, which subregion has had the fewest memory accesses, thus enabling selection of a subregion entry to be evicted.

Additionally, a subregion entry may also be evicted if a new delta value occurs more than twice. This can enable faster training to identify the delta values occurring with the highest frequencies for accesses to the memory region. When a new memory region is accessed, the initial subregion entry or entries can calculate and track new delta values. When a frequency of a delta value reaches three, an eviction can be triggered. The delta values can be sorted and the most frequently occurring delta values (e.g., three occurrences) may be identified and used to update the delta values stored in the region entry of the pattern table. This eviction policy ensures that a new delta in a new region is quickly put into the pattern table, rather than waiting for the subregion entry to be evicted from the subregion buffer based on age and/or least recently used criteria. Thus, such a policy results in faster training of the RAD prefetcher.

Once a subregion entry is selected for eviction at 504, such as subregion entry 512(1), accuracy calculations, sorting, and pattern table updating may be performed at 514. For ease of description, it will be assumed that subregion entry 512(1) is selected for eviction. Prefetch accuracy of the prefetching performed for subregion 542(1), which is tracked in the selected subregion entry 512(1), may be calculated. In one example, the access map (e.g., 222) and prefetch map (e.g., 224) may be used to calculate prefetch accuracy. At the time of eviction, the access map indicates all cache line accesses in subregion 542(1) during the temporal window (e.g., while subregion entry 512(1) was stored in subregion buffer 510). Prefetch map 224 may indicate all cache line prefetches based on cache line accesses in subregion 542(1). Thus, the logical AND operation of the access map and the prefetch map can indicate the number of cache lines that were accessed by the program and predicted correctly. This number can be divided by the total number of ones in the prefetch map to calculate the percentage of accurate prefetches. In some implementations, as will be further described herein, fewer prefetches may be performed and may be indicated in the issue map (e.g., 226). In this scenario, the issue map may be used with the access map to calculate accuracy of the prefetches. The calculated accuracy may be used to update an accuracy value (e.g., 424) in region entry 522(1).

If the accuracy of prefetches within a subregion is less than certain threshold (e.g., 30%) the prefetches in that subregion may be throttled. A low accuracy threshold can also limit the number of delta values used for prefetch generation. For example, instead of calculating and issuing five prefetches (based on the top five most frequently occurring delta values in the memory region), a smaller number of prefetches (e.g., two) may be issued instead.

Determining and selecting the most frequently occurring delta values may also be performed upon eviction of a subregion entry. The delta values tracked in the subregion entry may be sorted based on their respective frequency values (e.g., 264(1)-264(n)). Once sorted, a predetermined number of the most frequently occurring delta values (e.g., the delta values with the highest frequency) can be selected. In one example the predetermined number to be selected is five. A determination can be made as to whether the selected delta values and corresponding frequency values should update the corresponding region entry 522(1). In one or more embodiments, the delta values and corresponding frequency values in region entry 522(1) may be updated with the selected delta values and corresponding frequency values from subregion entry 512(1) such that the region entry 522(1) contains the most frequently occurring delta values (e.g., the delta values with the highest frequency values).

Figure 6:
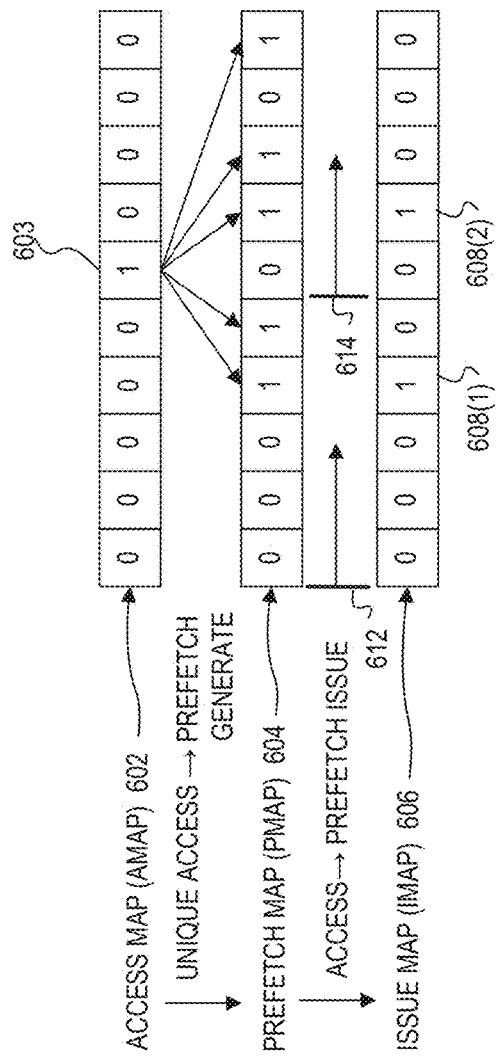
FIG. 6 is a block diagram illustrating a decoupled prefetch generate and issue on two wavefronts according to at least one embodiment.

Turning to FIG. 6, FIG. 6 illustrates an optimization for prefetch generation and issue in a RAD prefetcher according to at least one embodiment. FIG. 6 illustrates an access map (AMAP) 602, a prefetch map (PMAP) 604, and an issue map (IMAP) 606 for a subregion (e.g., 542(1)) of a memory region (e.g., 540(1)) allocated to a program. In this example, access map 602 indicates one cache line access 603 by the program. In one or more embodiments, in response to the cache line access in the subregion, five prefetches may be issued based on the most frequently occurring five delta values. Prefetch map 604 illustrates five set bits that represent cache lines that were identified using the five most frequently occurring delta values. The five set bits represent cache lines that are candidates for prefetch.

For some systems, five prefetches issued per request could potentially overwhelm the system. Accordingly, a smaller number of prefetches may be selected in some embodiments. One possible process for selecting two prefetches from the five prefetch candidates is to use two wavefronts 612 and 614 in the prefetch map 604 to select the two prefetches that are to be performed. For example, a first wavefront 612 begins at the bit representing cache line 0, and the second wavefront 614 begins at the bit that represents the cache line that was targeted in the latest memory access request to the subregion. From each of the two wavefronts 612 and 614, the first set bit occurring in the prefetch map 604 to the right of each wavefront may be selected for prefetching. In this example, a fourth bit 608(1) and a seventh bit 608(2) may be identified and the cache lines represented by these bits may be selected for prefetching. Once two prefetches have been selected (e.g., one from each wavefront as candidates), the number of prefetch requests that are dispatched per cycle to bring the data to cache could be architecture dependent. This optimization allows prefetches to be issued efficiently for both positive and negative delta values. It should be noted, however, that any number of prefetches could be selected including a single prefetch or any other number depending on how many candidates have been identified.

Figure 7:
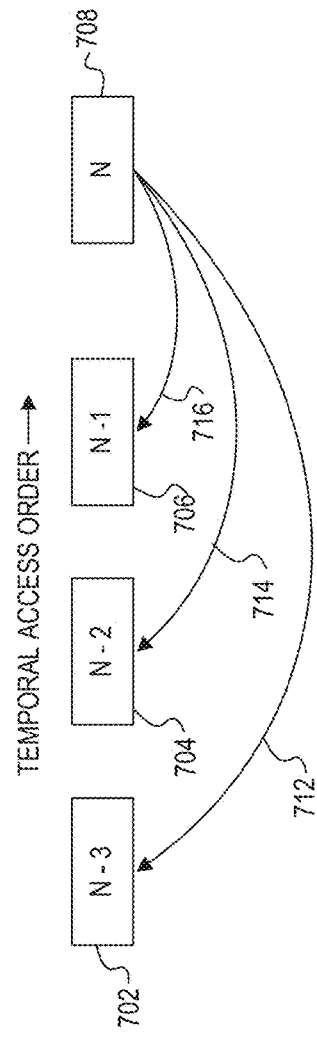
FIG. 7 is a block diagram illustrating 3-level temporal deltas according to at least one embodiment.

FIG. 7 illustrates one possible optimization for tracking delta values in a subregion according to one or more embodiments of region aware delta prefetching. FIG. 7 shows a block diagram illustrating 3-level temporal deltas. In at least one embodiment, when delta values are calculated based on a memory access to a cache line of a subregion during a temporal window of that subregion (e.g., when a subregion entry for the subregion is present in subregion buffer 510), up to three delta values may be calculated depending, at least in part, on how many prior memory accesses to that subregion have occurred during the temporal window. This helps improve prefetch timeliness and can limit prefetch degree for higher accuracy.

FIG. 7 illustrates temporal unique cache line accesses in a subregion. For example, FIG. 7 shows a current unique cache line access (N) 708, a first prior unique cache line access (N−1) 706, a second prior unique cache line access (N−2) 704, and a third prior unique cache line access (N−3) 702. In this embodiment, RAD prefetcher 500 tracks delta values, not just between consecutive unique cacheline accesses (e.g., N, N−1) as indicated at 716, but also between the current unique cache line access (N) 708 and the second prior unique cache line access (N, N−2) as indicated at 714, and between the current unique cache line access (N) 708 and the third prior unique cacheline access (N, N−3) as indicated at 712.

In one or more embodiments, this optimization can be accomplished by storing three temporal offsets that can be used to calculate the delta values. The temporal offsets can correspond to bits in a bit vector for the subregion (e.g., AMAP 222). Each bit in the bit vector represents one of the cache lines in the subregion. For example, an offset for cache line 0 could equal 0, an offset for cache line 1 could equal 1, an offset for cache line 2 could equal 2, and so on. An offset of the current unique cache line access (N) could be determined and then delta values could be determined by subtracting each temporal offset for the prior accesses (i.e., N−1, N−2, and N−3) from the temporal offset for the current access. The resulting delta values may be positive or negative values depending on which bits in the bit vector correspond to the previously-accessed cache lines and to the currently-accessed cache line.

It should be noted that, as each new unique cache line is accessed, the temporal offsets may be shifted, with the third prior temporal offset being dropped from the temporal offsets completely. A temporal offset for the new unique cache line may be determined and added to the subregion entry as the first temporal offset.

Figure 8A:
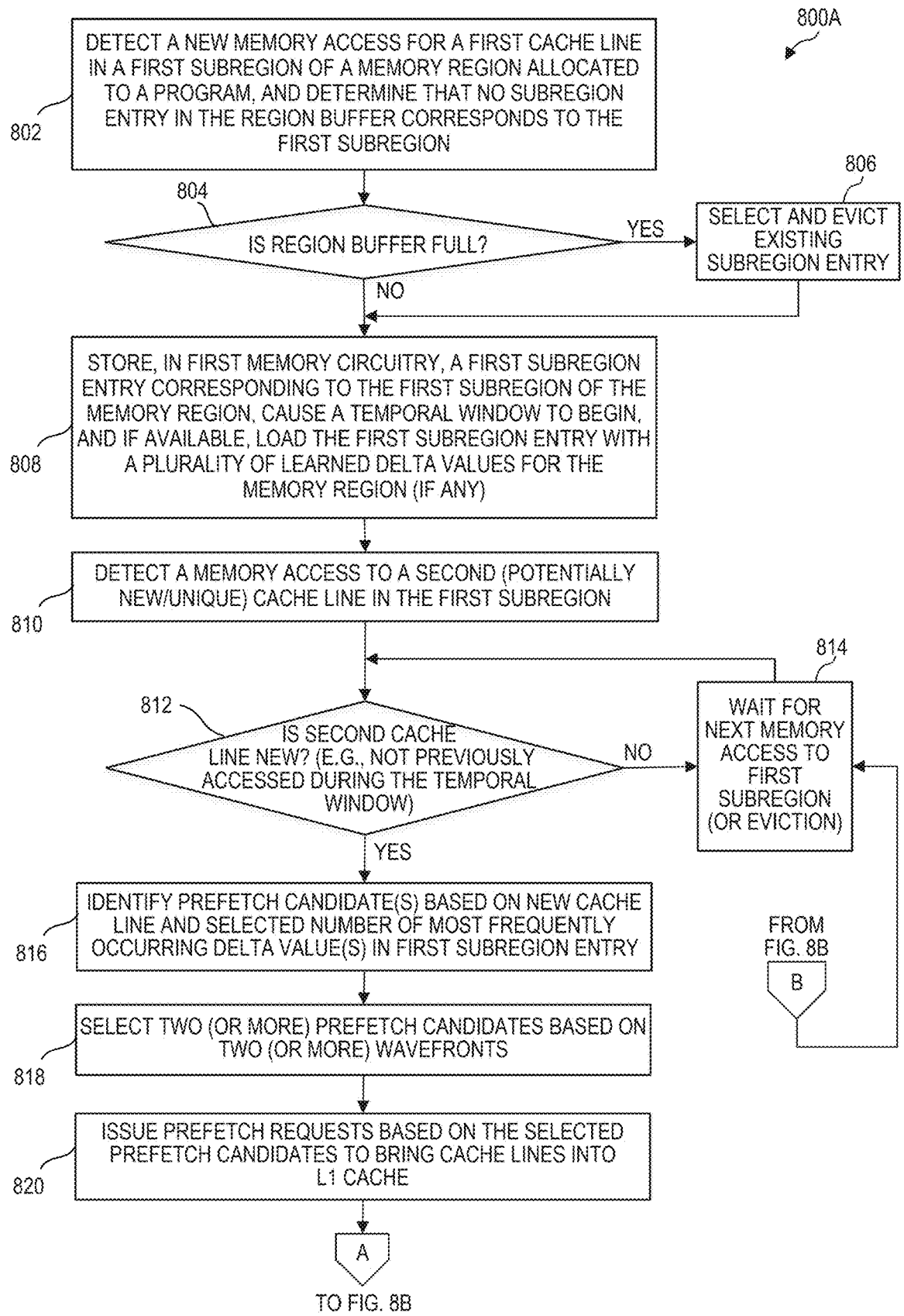
FIGS. 8A-8B are flow diagrams of an example process for region aware delta prefetching according to at least one embodiment.
Figure 8B:
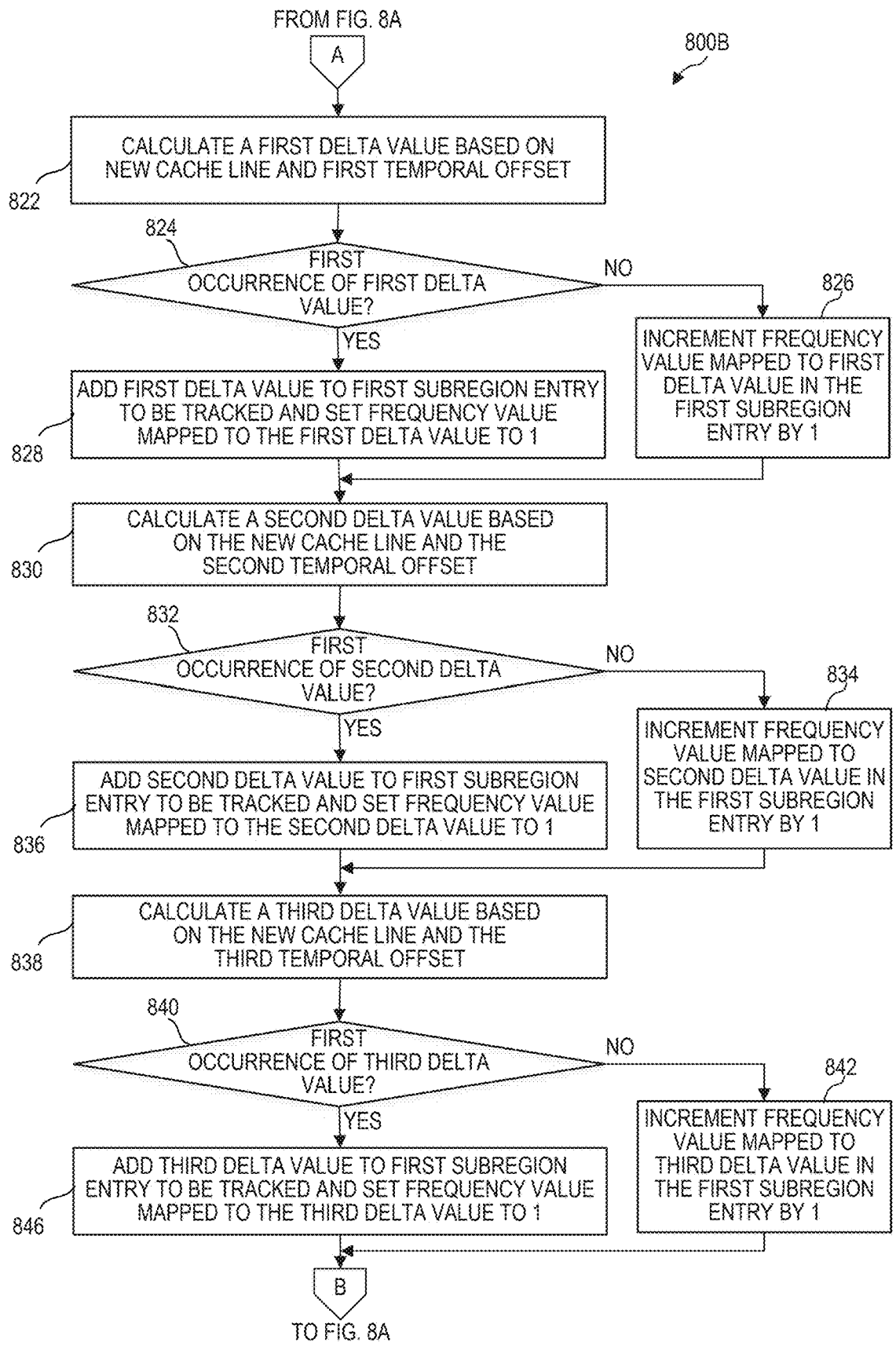

FIGS. 8A-8B illustrate flow diagrams of an example process 800 for region aware delta prefetching according to one or more embodiments. Process 800 may be performed, for example, by a computing system that comprises any suitable combination of hardware (e.g., circuitry, programmable logic, dedicated logic), firmware (e.g., microcode), and/or software (e.g., instructions that are executable on a machine readable media). Process 800 may be performed in computing system 100, and particularly, in a region aware delta prefetcher (e.g., 110, 500). In one example, least some of the operations of process 800 may be performed by prefetch circuitry (e.g., 112), and at least some of the data and information related to process 800 may be stored and/or obtained from a region aware buffer (e.g., 114, 200, 510) and/or a pattern table (e.g., 116, 400, 520). For ease of illustration, references to elements of FIGS. 1-4 may be made when describing process 800, although it should be apparent that elements in other FIGURES are also applicable to process 800.

At 802, the conditions for inserting a new subregion entry into a region buffer are met. A new memory access is detected for a first cache line in a first subregion of a memory region allocated to a program, and a determination is made that no subregion entry currently in the region buffer corresponds to the first subregion. In one example, the memory access may be detected as a new memory access for the first cache line in the first subregion by detecting an L1 cache miss event, for example, by prefetch circuitry 112. Accordingly, flow continues so that a first subregion entry corresponding to the first subregion can be inserted into the subregion buffer, and a new temporal window can begin.

In response to detecting the L1 cache miss event for the requested first cache line and to determining that no subregion buffer corresponding to the first subregion is present in the region buffer, at 804, a determination is made as to whether a subregion buffer 114 of a region aware delta prefetcher 110 is full. If the subregion buffer is full, then at 806, an existing subregion entry in the subregion buffer is selected for eviction and evicted to make room for a new subregion entry to be added for the new cache line begin accessed in the first subregion. An example process for evicting a subregion entry is further described with reference to FIG. 9.

Once an existing subregion entry is evicted, or if the subregion buffer was determined not to be full at 804, then at 808, a first subregion entry is stored in the subregion buffer 114. Storing the first subregion entry in the subregion buffer marks the beginning of a temporal window for the first subregion, which continues until the first subregion entry is evicted from the subregion buffer.

The first subregion entry can contain metadata as shown and described herein, at least with reference to FIG. 2. For example, the first subregion entry may include an access map (e.g., 222) of cache lines in the first subregion. A bit can be set in the access map to indicate which cache line was accessed in response to the memory access request that triggered the L1 cache miss event. Additional bits may be set in the access map for subsequent memory accesses of other cache lines in the first subregion.

The first subregion entry may also include metadata to identify the first cache line during the next three consecutive memory accesses to the first subregion. This metadata may be in the form of a temporal offset that indicates the distance (displacement) between the beginning of the access map and the bit that represents the first cache line. The offset may initially be stored as a first temporal offset (e.g., 252(1)) to indicate that the first cache line was the last cache line to be accessed in the first subregion. As subsequent accesses for cache lines in the first subregion occur, the offset corresponding to the first cache line may be shifted to another metadata field in the first subregion entry to indicate that the first cache line is the second-to-last cache line (e.g., second temporal offset 252(2)) to be accessed in the first subregion, or the third-to-last cache line (e.g., third temporal offset 252(3)) to be accessed in the first subregion, as appropriate. Additionally, a region tag (e.g., 246) identifying the first memory region, a subregion tag (which may be included with the region tag) identifying the first subregion, an access counter (e.g., 232), a valid bit (e.g., 242), and a least recently used (LRU) information 244 may also be included.

If the program has not been running long enough to track and learn any delta values based on memory accesses to the subregions of the memory region, then the first subregion entry is not initially populated with any learned delta values for the memory region. Instead, the prefetch circuitry may calculate delta values in response to memory accesses to new cache lines in the first subregion and may track the frequency of occurrences of the delta values based on memory accesses to new cache lines in the first subregion. The prefetch circuitry may track up to the maximum number (e.g., 16) of delta values allowed in the first subregion entry. If any of the delta values is observed more than a predetermined number of times (e.g., more than twice), then the first subregion entry may be evicted. The delta values in the first subregion that have the highest frequency values may be used to update a region entry of a pattern table, where the region entry tracks learned delta value information for the memory region that contains the first subregion. In one embodiment, delta values having the highest frequency of occurrence may be identified by sorting the delta values based on frequency values mapped to the delta values in the first subregion entry.

If the program has been running long enough to track and learn at least some of the most frequently occurring delta values of memory accesses to the memory region, then up to a predetermined maximum number (e.g., 5) of these learned delta values may be stored in the pattern table within the region entry that tracks learned delta value information for the memory region. Any delta values stored in the region entry of the pattern table would have been learned in one or more expired temporal windows of other subregions and/or of the first subregion. If one or more learned delta values are stored in the region entry, then those learned delta values and associated frequency values can be used to populate the first subregion entry. Additionally, prefetch candidates may be identified using the newly populated delta values, one or more of the prefetch candidates may be selected, and prefetch requests may be issued based on the selected prefetch candidates.

The prefetch circuitry may continue to calculate delta values in response to subsequent memory accesses to new cache lines in the first subregion during the temporal window. New delta values may be tracked by adding the new delta values and associated frequency values to the first subregion entry and updating the associated frequency values based on the occurrences. The prefetch circuitry may track up to the maximum number (e.g., 16) of delta values that may be tracked and stored in the first subregion entry, including the learned delta values loaded from the region entry. The frequency values of the learned delta values loaded in the first subregion entry from the region entry may also be tracked by incrementing the frequency values when their associated delta values are calculated for a subsequent memory access to a new cache line in the first subregion.

The prefetch circuitry may also track the frequency of occurrences of the delta values based on memory accesses to new cache lines in the first subregion. The prefetch circuitry may track up to the maximum number (e.g., 16) of delta values allowed in the first subregion entry. If any of the delta values is observed more than a predetermined number of times (e.g., more than twice), then the first subregion entry may be evicted. The delta values in the first subregion entry selected for eviction that have the highest frequency of occurrence may be used to update a region entry of a pattern table, where the region entry tracks learned delta value information for the memory region that contains the first subregion. Delta values may be identified as having the highest frequency of occurrence by sorting the delta values based on frequency values mapped to the delta values in the first subregion entry, Once the first subregion entry is stored in the region buffer and populated with appropriate data, at 810, a memory access to a second (potentially new/unique) cache line in the first subregion may be detected. At 812, a determination is made as to whether the second cache line has previously been accessed during the current temporal window (e.g., since the first subregion entry was stored in the region buffer). If the second cache line has previously been accessed during the temporal window, then the cache line is not a new/unique access within the temporal window. Therefore, at 814, prefetch circuitry may wait for the next memory access to the first subregion or eviction of the first subregion entry, whichever comes first.

If the second cache line has not previously been accessed during the temporal window, then the second cache line is a "new" or "unique" access for the temporal window. A bit location (or offset) within the access map (e.g., 222) that represents the new cache line may be determined and updated (e.g., set to 1) to indicate which cache line in the subregion has been accessed. In addition, at 816, one or more prefetch candidates may be identified based on the new cache line and a selected number of the most frequently occurring delta values in the first subregion entry. The selected number may be, for example, five. However, in other embodiments, different numbers of prefetch candidates may be identified using a different number of delta values. The most frequently occurring delta values may be determined based on associated frequency values in the first subregion entry. In at least some scenarios when delta values have been tracked and learned, all of the most frequently occurring delta values are previously learned delta values for the memory region that are loaded from the region entry to the first subregion entry at 808.

At 818, once the prefetch candidates (e.g., linear addresses of cache lines to be prefetched) have been identified, a certain number of the prefetch candidates may be selected to issue a prefetch request. For example, two prefetch candidates may be selected in one or more embodiments. This can ensure that the system can process the prefetches without significantly impacting performance.

At 820, the selected prefetch candidates are used to issue prefetch request(s). The prefetched cache lines may be brought directly into the L1 cache in one or more embodiments.

With reference to FIG. 8B, process 800B, when a new cache line in a subregion is accessed, new delta values may be calculated based on the new cache line and three temporal offsets in the first subregion entry that indicate the latest three cache lines to be accessed in the first subregion relative the current memory access for the new cache line. The use of three temporal offsets is for example purposes, and it should be appreciated that, in other embodiments, another number of temporal offsets may be tracked in subregion entries and used to calculate delta values for prefetching.

At 822, a first delta value is calculated based on the new cache line and the first temporal offset (e.g., 252(1)). For example, the bit location of the bit in the access map that represents the new cache line (e.g., the cache line offset) was previously determined (e.g., at 812). The difference between the cache line offset and the first temporal offset can be calculated to determine the first delta value.

At 824, a determination is made as to whether the calculated first delta value is a first occurrence of that delta value. If the calculated first delta value is already being tracked in the first subregion entry, then at 826, the frequency value mapped to the existing first delta value in the first subregion entry is incremented by one.

At 824, if the calculated first delta value is determined to be the first occurrence of that delta value for the first subregion, then at 828, the calculated first delta value is added to the first subregion entry to be tracked. A first frequency value mapped to the first delta value in the first subregion entry may be set to one. In at least one embodiment, up to sixteen delta values may be tracked in any given subregion entry. In other embodiments, RAD prefetcher may be designed to track greater or fewer delta values.

At 830, a second delta value is calculated based on the new cache line and the second temporal offset (e.g., 252(2)). The difference between the cache line offset (e.g., determined at 812) and the second temporal offset can be calculated to determine the second delta value.

At 832, a determination is made as to whether the calculated second delta value is a first occurrence of that delta value. If the calculated second delta value is already being tracked in the first subregion entry, then at 834, the frequency value mapped to the existing second delta value in the first subregion entry is incremented by one.

At 832, if the calculated second delta value is determined to be the first occurrence of that delta value for the first subregion, then at 836, the calculated second delta value is added to the first subregion entry to be tracked. A second frequency value mapped to the second delta value in the first subregion entry may be set to one.

At 838, a third delta value is calculated based on the new cache line and the third temporal offset (e.g., 252(3)). The difference between the cache line offset (e.g., determined at 812) and the third temporal offset can be calculated to determine the third delta value.

At 840, a determination is made as to whether the calculated third delta value is a first occurrence of that delta value. If the calculated third delta value is already being tracked in the first subregion entry, then at 842, the frequency value mapped to the existing third delta value in the first subregion entry is incremented by one.

At 840, if the calculated third delta value is determined to be the first occurrence of that delta value for the first subregion, then at 842, the calculated third delta value is added to the first subregion entry to be tracked. A third frequency value mapped to the third delta value in the first subregion entry may be set to one. Once all of the delta values have been calculated, the temporal offsets may be shifted in the temporal offset fields of the first subregion entry. For example, the second temporal offset may become the third temporal offset, the first temporal offset may become the second temporal offset, and the cache line offset may be stored as the new first temporal offset It should be noted when a subregion entry is instantiated, the temporal offsets will be added as new cache line accesses in the subregion occur. Thus, at the first access of a first new cache line in the subregion that triggers the subregion entry to be inserted in the subregion buffer, no delta values are calculated because there have been no prior memory accesses in the subregion during the new temporal window. However, the first temporal offset may be populated with the cache line offset of the first new cache line. When the second new cache line is accessed in the subregion, only one delta value is calculated because only the first temporal offset is present. When the third new cache line is accessed in the subregion, two delta values can be calculated because there are two temporal offsets for the prior two new cache lines that were accessed. When the fourth new cache line is accessed in the subregion, three delta values can be calculated because there are three temporal offsets for the prior three new cache lines that were accessed.

Once all of the delta values that can be calculated have been calculated, flow may continue in FIG. 8A at 814 to wait for the next memory access or eviction, whichever comes first.

Figure 9:
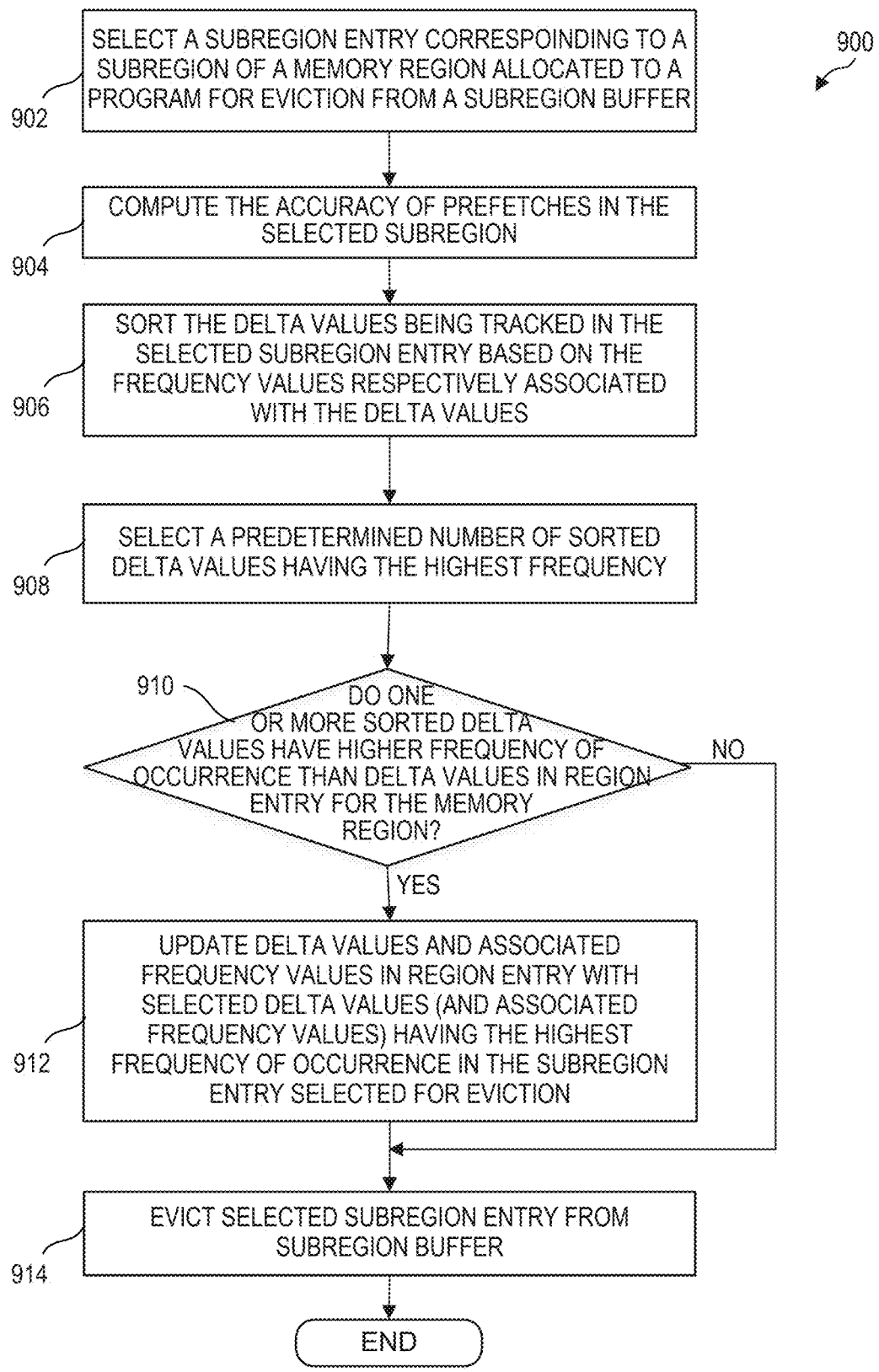
FIG. 9 is a flow diagram of an example process associated with region aware delta prefetching according to at least one embodiment.

FIG. 9 is a flow diagram of an example process 900 of associated with region aware delta prefetching according to one or more embodiments. Process 900 may be performed, for example, by a computing system that comprises any suitable combination of hardware (e.g., circuitry, programmable logic, dedicated logic), firmware (e.g., microcode), and/or software (e.g., instructions that are executable on a machine readable media). Process 900 may be performed in computing system 100, and particularly, in a region aware delta prefetcher (e.g., 110, 500). In one example, least some of the example operations of process 900 are related to evicting a subregion entry from a region buffer and may be performed when a subregion entry is selected for eviction (e.g., 806, 814). At least some operations of process 900 may be performed by prefetch circuitry (e.g., 112), and at least some of the data and information related to process 900 may be stored and/or obtained from a region aware buffer (e.g., 114, 200, 510) and/or a pattern table (e.g., 116, 400, 520). For ease of illustration, references to elements of FIGS. 1-4 may be made when describing process 900, although it should be apparent that elements in other FIGURES are also applicable to process 900.

At 902, a first subregion entry corresponding to a first subregion of a memory region allocated to a program is selected for eviction from a region buffer. For example, if a memory access to a cache line in a new subregion has been detected, and there is no corresponding subregion entry in the region buffer for the new subregion, then a new subregion entry is to be added to the region buffer. If the region buffer is full, then one of the existing subregion entries may be selected for eviction. For example, the least recently used subregion entry may be selected.

In another example, if a new delta value is being tracked by a subregion entry, then if the new delta value occurs more than predetermined number of times (e.g., more than twice), then the subregion entry may be selected for eviction, as previously discussed herein. For ease of explanation, the subregion and corresponding subregion entry that is selected for eviction and the corresponding subregion, are referred to as "selected subregion entry" and "selected subregion," respectively.

At 904, the accuracy of the prefetches that were performed in the selected subregion during the temporal window for the selected subregion may be calculated. This calculation may be performed using an access map (e.g., 222) and a prefetch map (e.g., 224) in the selected subregion entry. In some scenarios, where not all prefetch candidates are selected for prefetching, an issue map (e.g., 226) may be used with the access map to calculate prefetch accuracy.

At 906, the delta values tracked in the selected subregion entry may be sorted based on their respective frequency values (e.g., 264(1)-264(n)). At 908, once sorted, a predetermined number of the most frequently occurring delta values (e.g., the delta values with the highest frequency) for memory accesses within the selected subregion can be selected. The predetermined number to be selected corresponds to the maximum number of delta values that are tracked and stored by the region entry. In one example, the predetermined number to be selected is five. If the subregion entry is tracking fewer than the maximum number of delta values stored by the region entry, however, then all of the delta values in the subregion entry can be selected.

At 910, a determination can be made as to whether any of the selected highest frequency delta values have higher frequency values than the learned delta values in the region entry that tracks learned delta values for the entire memory region. If any of the selected delta values in the selected subregion entry have a higher frequency value than the learned delta values in the region entry, then at 912, the region entry is updated with the selected delta values and associated frequency values from the selected subregion entry so that the region entry holds the most frequently occurring delta values. It should be noted that in some implementations, a check (e.g., at 910) may not be performed and the updating may occur each time, even if the delta values and associated frequency values have not changed. Furthermore, it should be apparent that updating the region entry may include changing delta values and/or frequency values that are different, or it may include simply replacing the existing delta values and frequency values in the region entry with the selected delta values and frequency values from the selected subregion entry.

At 914, the selected subregion entry is evicted from the subregion buffer.

FIGS. 10-13 described below detail exemplary architectures and systems to implement embodiments of the region aware delta prefetching described above. In some embodiments, one or more hardware components and/or instructions described above are emulated as detailed below or implemented as software modules. Other computer architecture designs known in the art for processors, mobile devices, computing systems, and components thereof may also (or alternatively) be used. Generally, suitable computer architectures for embodiments disclosed (e.g., computing system 100, processor 102, core 104, region aware delta prefetcher 110, memory access units 106, L1 cache 122, L2 cache 126, L3 cache 128, main memory 130, etc.) herein can include, but are not limited to, configurations illustrated in the below FIGS. 10-13.

Figure 10:
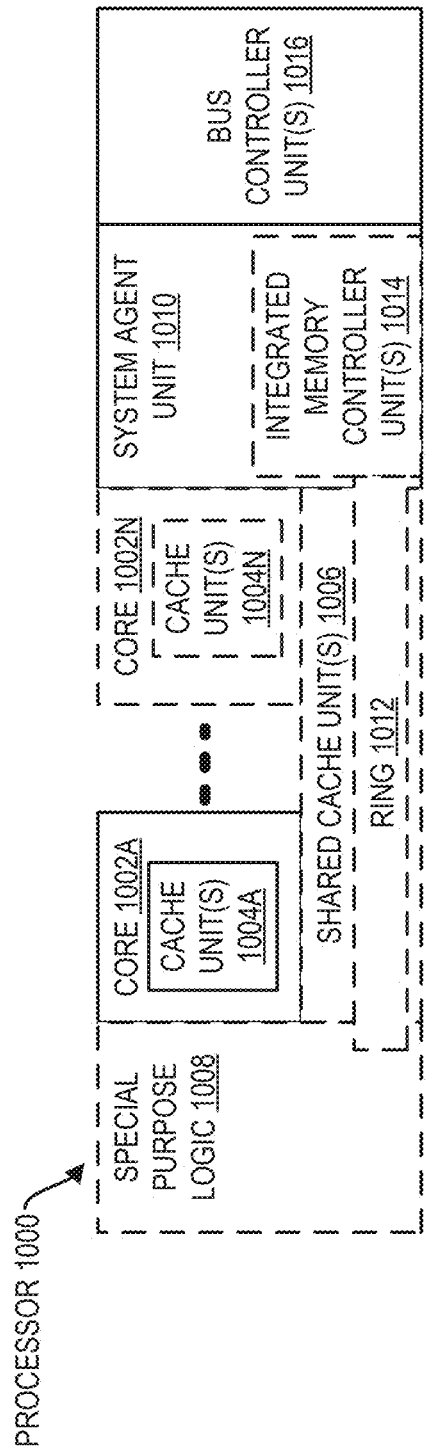
FIG. 10 is a block diagram of a processor that may have more than one core, may have an integrated memory controller, and may have integrated graphics according to embodiments of the present disclosure.

FIG. 10 is a block diagram of a processor 1000 that may have more than one core, may have an integrated memory controller, and may have integrated graphics according to one or more embodiments of this disclosure. Processor 1000 is an example of a type of hardware device that can be used in connection with the implementations shown and described herein (e.g., processor 102). The solid lined boxes in FIG. 10 illustrate a processor 1000 with a single core 1002A, a system agent unit 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008. Processor 1000 and its components (e.g., cores 1002A-N, cache unit(s) 1004A-N, shared cache unit(s) 1006, etc.) represent example architecture that could be used to implement processor 102 and at least some of its components.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of executing the same instruction set, while others may be capable of executing only a subset of that instruction set or a different instruction set.

Figure 11A:
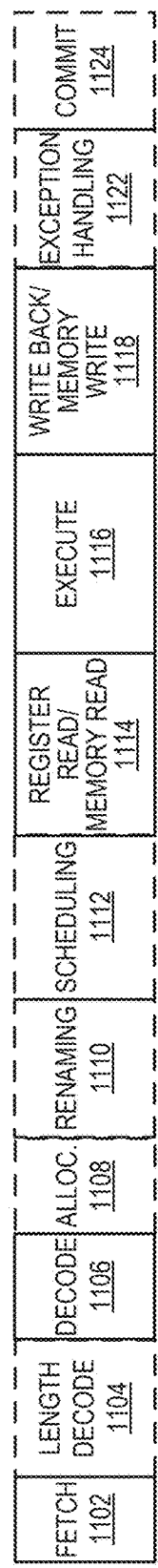
FIG. 11A is a block diagram illustrating both an exemplary in-order pipeline and an exemplary register renaming, out-of-order issue/execution pipeline in accordance with at least one embodiment.
Figure 11B:
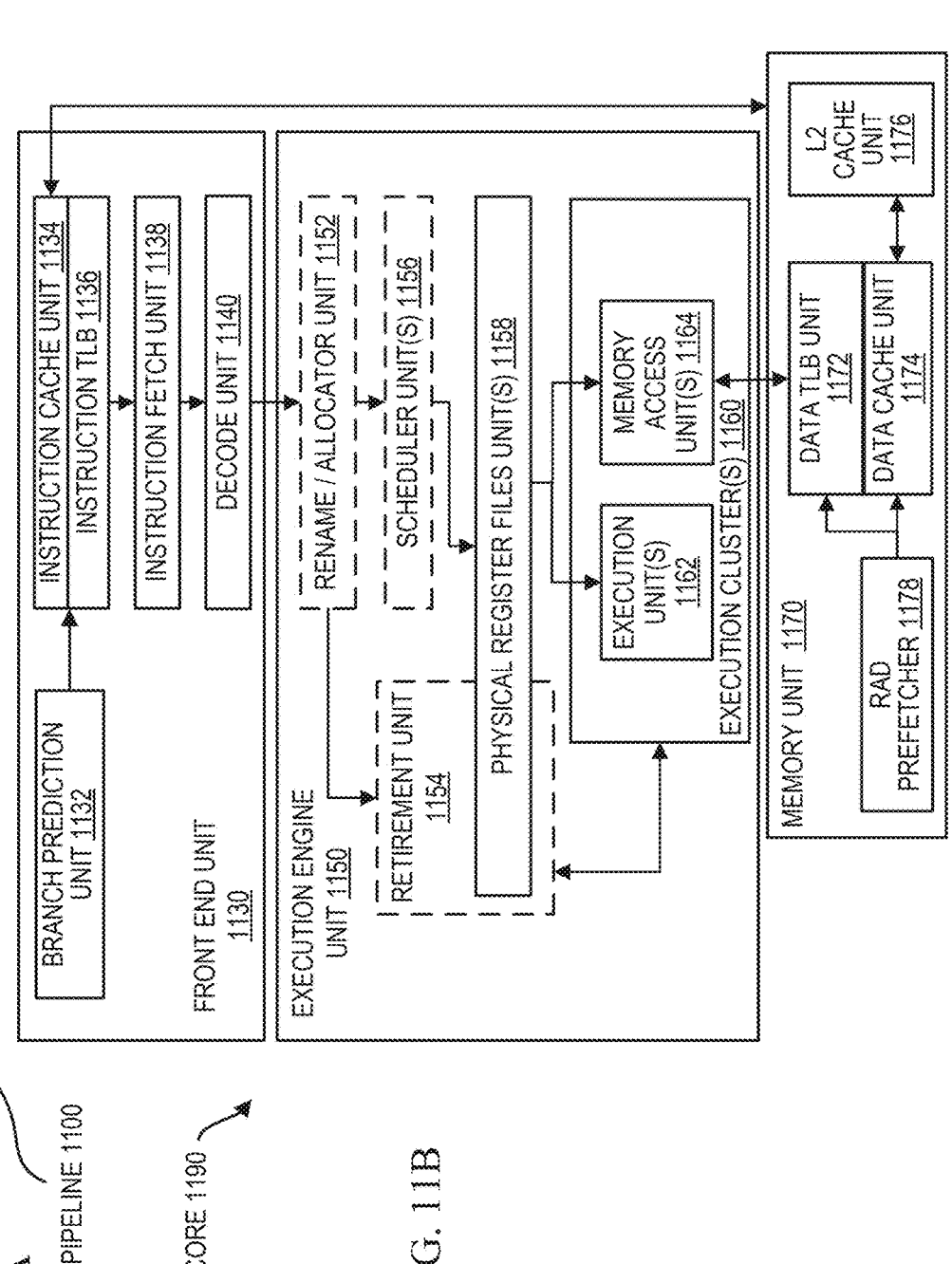
FIG. 11B is a block diagram illustrating both an exemplary embodiment of an in-order architecture core and an exemplary register renaming, out-of-order issue/execution architecture core to be included in a processor in according to at least one embodiment.

FIG. 11A is a block diagram illustrating both an exemplary in-order pipeline and an exemplary register renaming, out-of-order issue/execution pipeline according to one or more embodiments of this disclosure including region aware delta prefetching. FIG. 11B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 11A-11B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. Processor core 1190 and memory unit 1170 are examples of the types of hardware that can be used in connection with the implementations shown and described herein (e.g., logical cores 142A-142D, memory 150). The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like. In addition, processor core 1190 and its components represent example architecture that could be used to implement logical processors and at least some of their respective components.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data translation lookaside buffer (TLB) unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory. In one or more embodiments, a region aware delta (RAD) prefetcher 1178 may be provided in memory unit 1170 and coupled to data cache unit 1174 (L1 cache) and data TLB 1172. RAD prefetcher 1178 may be the same or similar to embodiments described herein for a RAD prefetcher (e.g., 110, 500).

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the scheduling stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12:
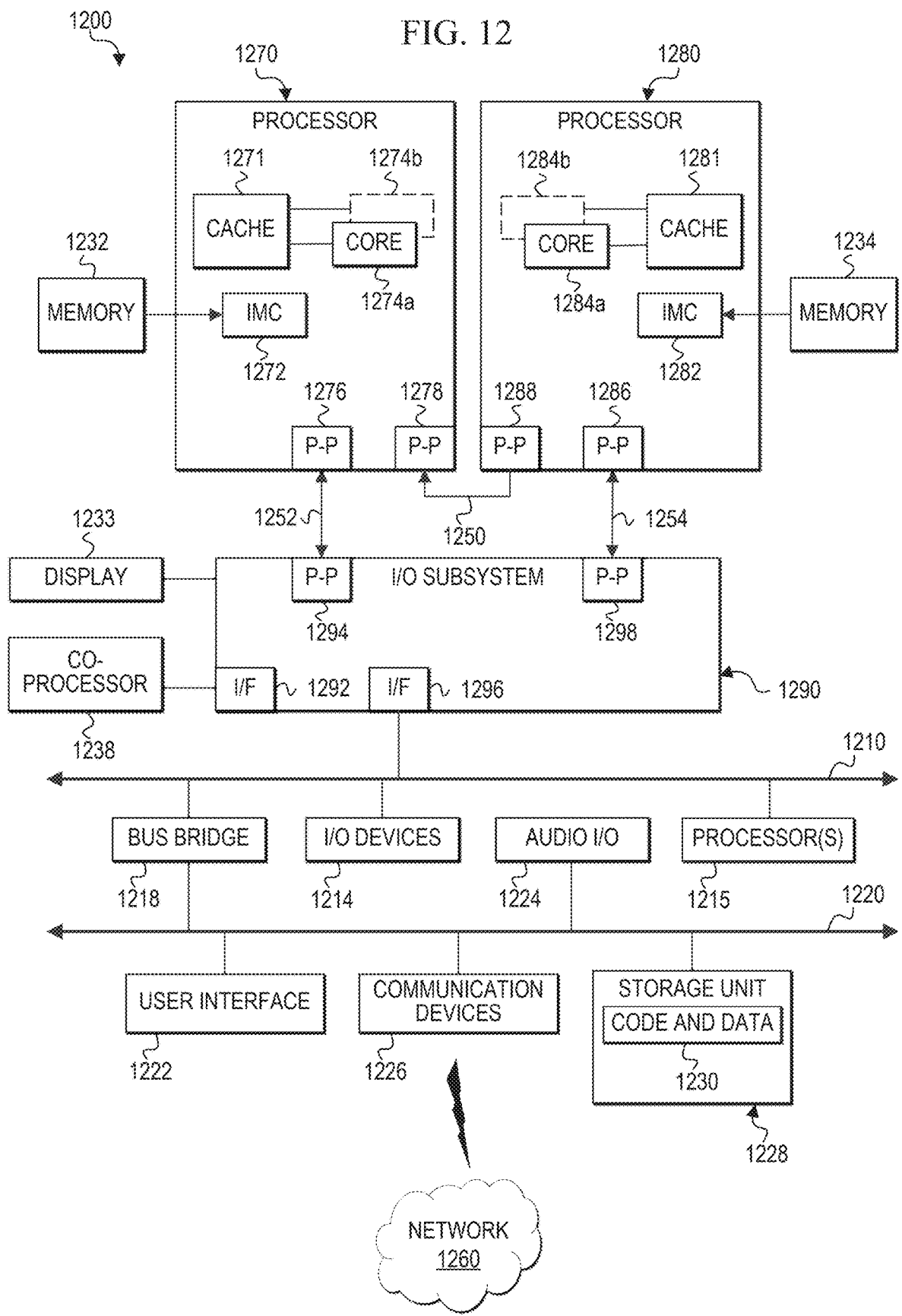
FIG. 12 is a block diagram of an example computer architecture according to at least one embodiment.

FIG. 12 illustrates a computing system 1200 that is arranged in a point-to-point (PtP) configuration according to an embodiment. In particular, FIG. 12 shows a system where processors, memory, and input/output devices are interconnected by a number of point-to-point interfaces. Generally, one or more of the computing systems or computing devices described herein (e.g., computing system 100) may be configured in the same or similar manner as computing system 1200 with appropriate hardware, firmware, and/or software to implement interrupt posting features, including a region aware prefetcher (e.g., 110, 500), as disclosed herein.

Processors 1270 and 1280 may be implemented as single core processors 1274a and 1284a or multi-core processors 1274a-1274b and 1284a-1284b. Processors 1270 and 1280 may each include a cache 1271 and 1281 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1200. Moreover, processors 1270 and 1280 are examples of the types of hardware that can be used in connection with the implementations shown and described herein (e.g., processor 102).

Processors 1270 and 1280 may also each include integrated memory controller logic (MC) 1272 and 1282 to communicate with memory elements 1232 and 1234, which may be portions of main memory locally attached to the respective processors. In alternative embodiments, memory controller logic 1272 and 1282 may be discrete logic separate from processors 1270 and 1280. Memory elements 1232 and/or 1234 may store various data to be used by processors 1270 and 1280 in achieving operations and functionality outlined herein.

Processors 1270 and 1280 may be any type of processor, such as those discussed in connection with other figures. Processors 1270 and 1280 may exchange data via a point-to-point (PtP) interface 1250 using point-to-point interface circuits 1278 and 1288, respectively. Processors 1270 and 1280 may each exchange data with an input/output (I/O) subsystem 1290 via individual point-to-point interfaces 1252 and 1254 using point-to-point interface circuits 1276, 1286, 1294, and 1298. I/O subsystem 1290 may also exchange data with a high-performance graphics circuit 1238 via a high-performance graphics interface 1239, using an interface circuit 1292, which could be a PtP interface circuit. In one embodiment, the high-performance graphics circuit 1238 is a special-purpose processor, such as, for example, a high-throughput MIC processor, a network or communication processor, compression engine, graphics processor, GPGPU, embedded processor, or the like. I/O subsystem 1290 may also communicate with a display 1233 for displaying data that is viewable by a human user. In alternative embodiments, any or all of the PtP links illustrated in FIG. 12 could be implemented as a multi-drop bus rather than a PtP link.

I/O subsystem 1290 may be in communication with a bus 1210 via an interface circuit 1296. Bus 1210 may have one or more devices that communicate over it, such as a bus bridge 1218, I/O devices 1214, and one or more other processors 1215. Via a bus 1220, bus bridge 1218 may be in communication with other devices such as a user interface 1222 (such as a keyboard, mouse, touchscreen, or other input devices), communication devices 1226 (such as modems, network interface devices, or other types of communication devices that may communicate through a computer network 1260), audio I/O devices 1224, and/or a data storage device 1228. Data storage device 1228 may store code and data 1230, which may be executed by processors 1270 and/or 1280. In alternative embodiments, any portions of the bus architectures could be implemented with one or more PtP links.

Program code, such as code 1230, may be applied to input instructions to perform the functions described herein and generate output information. The output information may be applied to one or more output devices, in known fashion. For purposes of this application, a processing system may be part of computing system 1200 and includes any system that has a processor, such as, for example; a digital signal processor (DSP), a microcontroller, an application specific integrated circuit (ASIC), or a microprocessor.

The program code (e.g., 1230) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 12 is a schematic illustration of an embodiment of a computing system that may be utilized to implement various embodiments discussed herein. It will be appreciated that various components of the system depicted in FIG. 12 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
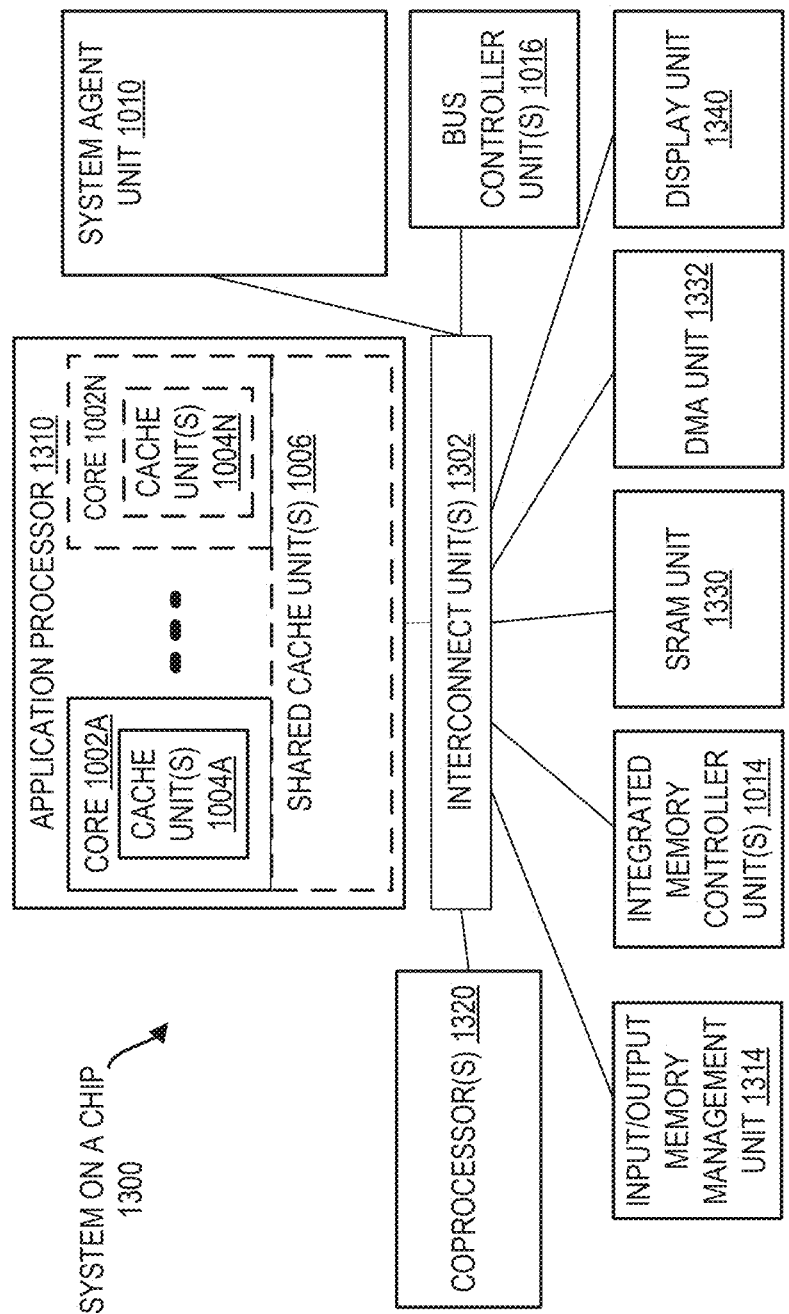
FIG. 13 is a block diagram of an example computer architecture for a system-on-a-chip according to at least one embodiment.

Referring now to FIG. 13, shown is a block diagram of a system-on-a-chip (SoC) 1300 in accordance with at least one embodiment of the present disclosure. Also, dashed lined boxes are optional features on more advanced SoCs. In FIG. 13, an interconnect unit(s) 1302 is coupled to: an application processor 1310 which includes a set of one or more cores 1002A-1002N with cache units 1004A-1004N (which may be coupled to a RAD prefetcher as disclosed herein), and shared cache unit(s) 1006; a system agent unit 1010; a bus controller unit(s) 1016; an integrated memory controller unit(s) 1014; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 includes a special-purpose processor, such as, for example, a network or communication processor, compression engine, GPGPU, a high-throughput MIC processor, embedded processor, or the like.

With regard to this specification generally, unless expressly stated to the contrary, use of the phrases 'at least one of' and 'one or more of' refers to any combination of the named elements, conditions, activities, messages, regions, subregions, entries, or devices. For example, 'at least one of X, Y, and Z' and 'one or more of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular items (e.g., element, condition, module, activity, operation, claim element, messages, protocols, interfaces, devices etc.) they modify, but are not intended to indicate any type of order, rank, importance, temporal sequence, or hierarchy. For example, 'first X' and 'second X' are intended to designate two separate X elements that are not necessarily limited by any order, rank, importance, temporal sequence, or hierarchy of the two elements, unless specifically stated to the contrary.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

OTHER NOTES AND EXAMPLES

The following examples pertain to embodiments in accordance with this specification. Example A1 provides an apparatus, where the Example of A1 includes: memory circuitry including a first data structure, and prefetch circuitry coupled to the memory circuitry, and the prefetch circuitry is to: store, in the first data structure, a first subregion entry corresponding to a first subregion of a memory region allocated to a program, the first subregion entry to include a plurality of delta values, a first delta value of the plurality of delta values representing a first distance between two cache lines associated with consecutive memory accesses within a second subregion of the memory region, detect a first memory access of a first cache line in the first subregion, identify prefetch candidates based on the first cache line and the plurality of delta values, and issue at least one prefetch request based on at least two of the prefetch candidates to be prefetched into a cache.

Example A2 comprises the subject matter of Example A1, and the first subregion entry is to be stored in the first data structure in response to the prefetch circuitry detecting a new memory access request to the first subregion and determining that the first subregion entry is missing from the first data structure.

Example A3 comprises the subject matter of any one of Examples A1-A2, and the prefetch circuitry is further to determine a second delta value representing a second distance between the first cache line in the first subregion and a second cache line in the first subregion, the second cache line to be accessed by the program prior to the first cache line being accessed and without an intervening memory access to the first subregion.

Example A4 comprises the subject matter of Example A3, and the prefetch circuitry is further to, in response to determining that the second delta value is one of the plurality of delta values in the first subregion entry, increment a second frequency value mapped to the second delta value in the first subregion entry.

Example A5 comprises the subject matter of Example A3, and the prefetch circuitry is further to, in response to determining that the second delta value is not included in the plurality of delta values in the first subregion entry, store the second delta value and a second frequency value mapped to the second delta value in the first subregion entry.

Example A6 comprises the subject matter of Example A5, and the prefetch circuitry is further to, in response to determining that the second frequency value is at least three, evict the first subregion entry from the first data structure.

Example A7 comprises the subject matter of any one of Examples A3-A6, and the prefetch circuitry is further to determine a third delta value representing a third distance between the first cache line and a third cache line in the first subregion, the third cache line to be accessed by the program prior to the second cache line being accessed, without an intervening memory access to the first subregion, and in response to determining that the third delta value is one of the plurality of delta values in the first subregion entry, increment a third frequency value mapped to the third delta value in the first subregion entry.

Example A8 comprises the subject matter of Example A7, and the prefetch circuitry is further to determine a fourth delta value representing a fourth distance between the first cache line and a fourth cache line in the first subregion, the fourth cache line to be accessed by the program prior to the third cache line being accessed, without an intervening memory access to the first subregion, and in response to determining that the fourth delta value is one of the plurality of delta values in the first subregion entry, increment a fourth frequency value mapped to the fourth delta value in the first subregion entry.

Example A9 comprises the subject matter of any one of Examples A1-A8, and a first temporal window is to begin upon the first subregion entry being stored in the first data structure, and wherein the first temporal window is to end upon eviction of the first subregion entry from the first data structure.

Example A10 comprises the subject matter of Example A9, and the prefetch candidates are to be identified in response to determining that the first cache line has not been accessed by the program during the first temporal window.

Example A11 comprises the subject matter of any one of Examples A9-A10, and the prefetch circuitry is further to store, in a second data structure of the memory circuitry, a region entry to track a predetermined number of most frequently occurring delta values for the memory region, and load the predetermined number of most frequently occurring delta values into the first subregion entry as the plurality of delta values.

Example A12 comprises the subject matter of Example A11, and the prefetch circuitry is further to prior to the first temporal window, evict from the first data structure a second subregion entry corresponding to the second subregion of the memory region, and update the predetermined number of most frequently occurring delta values in the region entry with a plurality of selected delta values from the second subregion entry.

Example A13 comprises the subject matter of Example A12, and wherein the prefetch circuitry is further to select the plurality of selected delta values in the second subregion entry to update the predetermined number of most frequently occurring delta values in the region entry based, at least in part, on respective frequency values of the plurality of selected delta values, and to update the predetermined number of most frequently occurring delta values in the region entry is to include updating corresponding frequency values in the region entry with a plurality of frequency values corresponding to the plurality of selected delta values.

Example A14 comprises the subject matter of any one of Examples A11-A13, and the prefetch circuitry is further to select the first subregion entry for eviction from the first data structure, determine that a sixth delta value is one of a selected number of most frequently occurring delta values in the first subregion entry based on a sixth frequency value and respective frequency values associated with each delta value of the plurality of delta values in the first subregion entry, and update an existing delta value in the predetermined number of most frequently occurring delta values in the region entry with the sixth delta value based on determining that the sixth frequency value is greater than another frequency value associated with the existing delta value in the region entry.

Example A15 comprises the subject matter of Example A14, and the prefetch circuitry is further to calculate an accuracy value of two or more prefetch requests for two or more cache lines in the first subregion during the first temporal window, and in response to the first subregion entry being selected for eviction from the first data structure, update the region entry to include the accuracy value.

Example A16 comprises the subject matter of any one of Examples A1-A15, and the prefetch circuitry is further to detect a second memory access to a fifth cache line in a third subregion of the memory region allocated to the program, and store a third subregion entry corresponding to the third subregion in the first data structure of the memory circuitry, wherein the third subregion entry is to include the plurality of delta values.

Example A17 comprises the subject matter of any one of Examples A1-A16, and the cache is a level one (L1) cache.

The following examples pertain to embodiments in accordance with this specification. Example S1 provides a system comprising a processor including a cache and a prefetch unit, the prefetch unit including prefetch circuitry and first memory circuitry, wherein the prefetch circuitry is to: store, in the first memory circuitry, a first subregion entry corresponding to a first subregion of a memory region allocated to a program, the first subregion entry to include a plurality of delta values, a first delta value of the plurality of delta values representing a first distance between two cache lines associated with consecutive memory accesses within a second subregion of the memory region, detect a first memory access of a first cache line in the first subregion, identify prefetch candidates based on the first cache line and the plurality of delta values, and issue at least one prefetch request based on at least two of the prefetch candidates to be prefetched into a cache.

Example S2 comprises the subject matter of Example S1, and the first subregion entry is to be stored in the first memory circuitry in response to the prefetch circuitry detecting a new memory access request to the first subregion and determining that the first subregion entry is missing from the first memory circuitry.

Example S3 comprises the subject matter of any one of Examples S1-52, and the prefetch circuitry is further to determine a second delta value representing a second distance between the first cache line in the first subregion and a second cache line in the first subregion, the second cache line to be accessed by the program prior to the first cache line being accessed and without an intervening memory access to the first subregion.

Example S4 comprises the subject matter of Example S3, and the prefetch circuitry is further to, in response to determining that the second delta value is one of the plurality of delta values in the first subregion entry, increment a second frequency value mapped to the second delta value in the first subregion entry.

Example S5 comprises the subject matter of Example S3, and the prefetch circuitry is further to, in response to determining that the second delta value is not included in the plurality of delta values in the first subregion entry, store the second delta value and a second frequency value mapped to the second delta value in the first subregion entry.

Example S6 comprises the subject matter of Example S5, and the prefetch circuitry is to, in response to determining that the second frequency value is at least three, evict the first subregion entry from the first memory circuitry.

Example S7 comprises the subject matter of any one of Examples S3-S6, and the prefetch circuitry is further to determine a third delta value representing a third distance between the first cache line and a third cache line in the first subregion, the third cache line to be accessed by the program prior to the second cache line being accessed, without an intervening memory access to the first subregion, and in response to determining that the third delta value is one of the plurality of delta values in the first subregion entry, increment a third frequency value mapped to the third delta value in the first subregion entry.

Example S8 comprises the subject matter of Example S7, and the prefetch circuitry is further to determine a fourth delta value representing a fourth distance between the first cache line and a fourth cache line in the first subregion, the fourth cache line to be accessed by the program prior to the third cache line being accessed, without an intervening memory access to the first subregion, and in response to determining that the fourth delta value is one of the plurality of delta values in the first subregion entry, increment a fourth frequency value mapped to the fourth delta value in the first subregion entry.

Example S9 comprises the subject matter of any one of Examples S1-S8, and a first temporal window is to begin upon the first subregion entry being stored in the first memory circuitry, and wherein the first temporal window is to end upon eviction of the first subregion entry from the first memory circuitry.

Example S10 comprises the subject matter of Example S9, and the prefetch candidates are to be identified in response to determining that the first cache line has not been accessed by the program during the first temporal window.

Example S11 comprises the subject matter of any one of Examples S9-S10, and further comprises second memory circuitry to store a region entry to track a predetermined number of most frequently occurring delta values for the memory region, and load the predetermined number of most frequently occurring delta values into the first subregion entry as the plurality of delta values.

Example S12 comprises the subject matter of Example S11, and the prefetch circuitry is further to prior to the first subregion entry being stored in the first memory circuitry, evict from the first memory circuitry a second subregion entry corresponding to the second subregion of the memory region, and update the predetermined number of most frequently occurring delta values in the region entry with a plurality of selected delta values from the second subregion entry.

Example S13 comprises the subject matter of Example S12, and the prefetch circuitry is further to select the plurality of selected delta values in the second subregion entry to update the predetermined number of most frequently occurring delta values in the region entry based, at least in part, on respective frequency values of the plurality of selected delta values, and to update the predetermined number of most frequently occurring delta values in the region entry is to include updating corresponding frequency values in the region entry with a plurality of frequency values corresponding to the plurality of selected delta values.

Example S14 comprises the subject matter of any one of Examples S11-S13, and the prefetch circuitry is further to select the first subregion entry for eviction from the first memory circuitry, determine that a second delta value is one of a selected number of most frequently occurring delta values in the first subregion entry based on a second frequency value and respective frequency values associated with each delta value of the plurality of delta values in the first subregion entry, and update an existing delta value in the predetermined number of most frequently occurring delta values in the region entry with the second delta value based on determining that the second frequency value is greater than another frequency value associated with the existing delta value in the region entry.

Example S15 comprises the subject matter of Example S14, and the prefetch circuitry is further to calculate an accuracy value of two or more prefetch requests for two or more cache lines in the first subregion after the first subregion entry was stored in the first memory circuitry, and in response to the first subregion entry being selected for eviction from the first memory circuitry, update the region entry to include the accuracy value.

Example S16 comprises the subject matter of any one of Examples S1-S15, and the prefetch circuitry is further to detect a second memory access to a fifth cache line in a third subregion of the memory region allocated to the program, and store a third subregion entry corresponding to the third subregion in the first memory circuitry, wherein the third subregion entry is to include the plurality of delta values.

Example S17 comprises the subject matter of any one of Examples S1-S16, and the cache is a level one (L1) cache.

The following examples pertain to embodiments in accordance with this specification. Example M1 provides a method comprising: storing in a first memory circuitry, by prefetch circuitry in a core, a first subregion entry corresponding to a first subregion of a memory region allocated to a program, wherein the first subregion entry includes a plurality of delta values, and wherein a first delta value of the plurality of delta values represents a first distance between two cache lines associated with consecutive memory accesses within a second subregion of the memory region, detecting a first memory access of a first cache line in the first subregion, identifying prefetch candidates based on the first cache line and the plurality of delta values, and issuing at least one prefetch request based on at least two of the prefetch candidates to be prefetched into a cache.

Example M2 comprises the subject matter of Example M1, and further comprises storing the first subregion entry in the first memory circuitry in response to detecting a new memory access request to the first subregion and determining that the first subregion entry is missing from the first memory circuitry Example M3 comprises the subject matter of any one of Examples M1-M2, and further comprises determining a second delta value representing a second distance between the first cache line in the first subregion and a second cache line in the first subregion, the second cache line accessed by the program prior to the first cache line being accessed and without an intervening memory access to the first subregion.

Example M4 comprises the subject matter of Example M3, and further comprises, in response to determining that the second delta value is one of the plurality of delta values in the first subregion entry, incrementing a second frequency value mapped to the second delta value in the first subregion entry.

Example M5 comprises the subject matter of Example M3, and further comprises, in response to determining that the second delta value is not included in the plurality of delta values in the first subregion entry, storing the second delta value and a second frequency value mapped to the second delta value in the first subregion entry.

Example M6 comprises the subject matter of Example M5, and further comprises, in response to determining that the second frequency value is at least three, evicting the first subregion entry from the first memory circuitry.

Example M7 comprises the subject matter of any one of Examples M3-M6, and further comprises determining a third delta value representing a third distance between the first cache line and a third cache line in the first subregion, the third cache line accessed by the program prior to the second cache line being accessed, without an intervening memory access to the first subregion, and in response to determining that the third delta value is one of the plurality of delta values in the first subregion entry, incrementing a third frequency value mapped to the third delta value in the first subregion entry.

Example M8 comprises the subject matter of Example M7, and further comprises determining a fourth delta value representing a fourth distance between the first cache line and a fourth cache line in the first subregion, the fourth cache line accessed by the program prior to the third cache line being accessed, without an intervening memory access to the first subregion, and in response to determining that the fourth delta value is one of the plurality of delta values in the first subregion entry, increment a fourth frequency value mapped to the fourth delta value in the first subregion entry.

Example M9 comprises the subject matter of any one of Examples M1-M8, and a first temporal window begins when the first subregion entry is stored in the first memory circuitry, and wherein the first temporal window ends the first subregion entry is evicted from the first memory circuitry.

Example M10 comprises the subject matter of Example M9, and the prefetch candidates are identified in response to determining that the first cache line has not been accessed by the program during the first temporal window.

Example M11 comprises the subject matter of any one of Examples M9-M10, and further comprises storing, in a second memory circuitry, a region entry to track a predetermined number of most frequently occurring delta values for the memory region, and loading the predetermined number of most frequently occurring delta values into the first subregion entry as the plurality of delta values.

Example M12 comprises the subject matter of Example M11, and further comprises, prior to the first temporal window, evicting from the first memory circuitry a second subregion entry corresponding to the second subregion of the memory region, and updating the predetermined number of most frequently occurring delta values in the region entry with a plurality of selected delta values from the second subregion entry.

Example M13 comprises the subject matter of Example M12, and further comprises selecting the plurality of selected delta values in the second subregion entry to update the predetermined number of most frequently occurring delta values in the region entry based, at least in part, on respective frequency values of the plurality of selected delta values, and the updating the predetermined number of most frequently occurring delta values in the region entry includes updating corresponding frequency values in the region entry with a plurality of frequency values corresponding to the plurality of selected delta values.

Example M14 comprises the subject matter of any one of Examples M11-M13, and further comprises selecting the first subregion entry for eviction from the first memory circuitry, determining that a sixth delta value is one of a selected number of most frequently occurring delta values in the first subregion entry based on a sixth frequency value and respective frequency values associated with each delta value of the plurality of delta values in the first subregion entry, and updating an existing delta value in the predetermined number of most frequently occurring delta values in the region entry with the sixth delta value based on determining that the sixth frequency value is greater than another frequency value associated with the existing delta value in the region entry.

Example M15 comprises the subject matter of Example M14, and further comprises calculating an accuracy value of two or more prefetch requests for two or more cache lines in the first subregion during the first temporal window, and in response to the first subregion entry being selected for eviction from the first memory circuitry, updating the region entry to include the accuracy value.

Example M16 comprises the subject matter of any one of Examples M1-M15, and further comprises detecting a second memory access to a fifth cache line in a third subregion of the memory region allocated to the program, and storing, in the first memory circuitry, a third subregion entry corresponding to the third subregion, wherein the third subregion entry includes the plurality of delta values.

Example M17 comprises the subject matter of any one of Examples M1-M16, and the cache is a level one (L1) cache.

The following examples pertain to embodiments in accordance with this specification. Example C1 provides one or more machine readable storage media including instructions stored thereon, and the instructions when executed are to cause a machine to: store in a first data structure in memory circuitry, a first subregion entry corresponding to a first subregion of a memory region allocated to a program, wherein the first subregion entry includes a plurality of delta values, and a first delta value of the plurality of delta values represents a first distance between two cache lines associated with consecutive memory accesses within a second subregion of the memory region, detect a first memory access of a first cache line in the first subregion, identify prefetch candidates based on the first cache line and the plurality of delta values, and issue at least one prefetch request based on at least two of the prefetch candidates to be prefetched into a cache.

Example C2 comprises the subject matter of Example C1, and the first subregion entry is to be stored in the first data structure in response to detecting a new memory access request to the first subregion and determining that the first subregion entry is missing from the first data structure.

Example C3 comprises the subject matter of any one of Examples C1-C2, and the instructions when executed are to cause the machine further to determine a second delta value representing a second distance between the first cache line in the first subregion and a second cache line in the first subregion, the second cache line to be accessed by the program prior to the first cache line being accessed and without an intervening memory access to the first subregion.

Example C4 comprises the subject matter of Example C3, and the instructions when executed are to cause the machine further to, in response to determining that the second delta value is one of the plurality of delta values in the first subregion entry, increment a second frequency value mapped to the second delta value in the first subregion entry.

Example C5 comprises the subject matter of Example C3, and the instructions when executed are to cause the machine further to, in response to determining that the second delta value is not included in the plurality of delta values in the first subregion entry, store the second delta value and a second frequency value mapped to the second delta value in the first subregion entry.

Example C6 comprises the subject matter of Example C5, and the instructions when executed are to cause the machine further to, in response to determining that the second frequency value is at least three, evict the first subregion entry from the first data structure.

Example C7 comprises the subject matter of any one of Examples C3-C6, and the instructions when executed are to cause the machine further to determine a third delta value representing a third distance between the first cache line and a third cache line in the first subregion, the third cache line to be accessed by the program prior to the second cache line being accessed, without an intervening memory access to the first subregion, and in response to determining that the third delta value is one of the plurality of delta values in the first subregion entry, increment a third frequency value mapped to the third delta value in the first subregion entry.

Example C8 comprises the subject matter of Example C7, and the instructions when executed are to cause the machine further to determine a fourth delta value representing a fourth distance between the first cache line and a fourth cache line in the first subregion, the fourth cache line to be accessed by the program prior to the third cache line being accessed, without an intervening memory access to the first subregion, and in response to determining that the fourth delta value is one of the plurality of delta values in the first subregion entry, increment a fourth frequency value mapped to the fourth delta value in the first subregion entry Example C9 comprises the subject matter of any one of Examples C1-C8, and a first temporal window is to begin upon the first subregion entry being stored in the first data structure, and wherein the first temporal window is to end upon eviction of the first subregion entry from the first data structure.

Example C10 comprises the subject matter of Example C9, and the prefetch candidates are to be identified in response to determining that the first cache line has not been accessed by the program during the first temporal window.

Example C11 comprises the subject matter of any one of Examples C9-C10, and the instructions when executed are to cause the machine further to store, in a second data structure of the memory circuitry, a region entry to track a predetermined number of most frequently occurring delta values for the memory region, and load the predetermined number of most frequently occurring delta values into the first subregion entry as the plurality of delta values.

Example C12 comprises the subject matter of Example C11, and the instructions when executed are to cause the machine further to prior to the first subregion entry being stored in the first data structure, evict from the first data structure a second subregion entry corresponding to the second subregion of the memory region, and update the predetermined number of most frequently occurring delta values in the region entry with a plurality of selected delta values from the second subregion entry.

Example C13 comprises the subject matter of Example C12, and the instructions when executed are to cause the machine further to select the plurality of selected delta values in the second subregion entry to update the predetermined number of most frequently occurring delta values in the region entry based, at least in part, on respective frequency values of the plurality of selected delta values, and to update the predetermined number of most frequently occurring delta values in the region entry is to include updating corresponding frequency values in the region entry with a plurality of frequency values corresponding to the plurality of selected delta values.

Example C14 comprises the subject matter of any one of Examples C11-C13, and the instructions when executed are to cause the machine further to select the first subregion entry for eviction from the first data structure, determine that a second delta value is one of a selected number of most frequently occurring delta values in the first subregion entry based on a second frequency value and respective frequency values associated with each delta value of the plurality of delta values in the first subregion entry, and update an existing delta value in the predetermined number of most frequently occurring delta values in the region entry with the second delta value based on determining that the second frequency value is greater than another frequency value associated with the existing delta value in the region entry.

Example C15 comprises the subject matter of Example C14, and the instructions when executed are to cause the machine further to calculate an accuracy value of two or more prefetch requests for two or more cache lines in the first subregion after the first subregion entry was stored in the first data structure, and in response to the first subregion entry being selected for eviction from the first data structure, update the region entry to include the accuracy value.

Example C16 comprises the subject matter of any one of Examples C1-C15, and the instructions when executed are to cause the machine further to detect a second memory access to a fifth cache line in a third subregion of the memory region allocated to the program, and store a third subregion entry corresponding to the third subregion in the first data structure of the memory circuitry, wherein the third subregion entry is to include the plurality of delta values.

Example C17 comprises the subject matter of any one of Examples C1-C16, and the cache is a level one (L1) cache.

Example X1 provides an apparatus, the apparatus comprising means for performing the method of any one of Examples M1-M17.

Example X2 comprises the subject matter of Example X1 can optionally include that the means for performing the method comprises at least one processor and at least one memory element.

Example X3 comprises the subject matter of Example X2 can optionally include that the at least one memory element comprises machine readable instructions that when executed, cause the apparatus to perform the method of any one of the preceding Examples.

Example X4 comprises the subject matter of any one of Examples X1-X3 can optionally include that the apparatus is one of a computing system, a region aware delta prefetcher, or a system-on-a-chip.

The invention claimed is:

1. An apparatus comprising:
   memory circuitry including a first data structure; and
   prefetch circuitry coupled to the memory circuitry, the prefetch circuitry to:
     store, in the first data structure, a first subregion entry corresponding to a first subregion of a memory region allocated to a program, the first subregion entry to include a plurality of delta values, a first delta value of the plurality of delta values representing a first distance between two cache lines associated with consecutive memory accesses within a second subregion of the memory region;
     detect a first memory access of a first cache line in the first subregion;
     select the first delta value based on the first delta value being one of a number of most frequently occurring delta values of the plurality of delta values in the first subregion entry;
     identify prefetch candidates based on the first cache line and the first delta value and on the first cache line and one or more other selected delta values of the plurality of delta values; and
     issue at least one prefetch request based on at least two of the prefetch candidates to be prefetched into a cache.

2. The apparatus of claim 1, wherein the first subregion entry is to be stored in the first data structure in response to the prefetch circuitry detecting a new memory access request to the first subregion and determining that the first subregion entry is missing from the first data structure.

3. The apparatus of claim 1, wherein the prefetch circuitry is further to:
   determine a second delta value representing a second distance between the first cache line in the first subregion and a second cache line in the first subregion, the second cache line to be accessed by the program prior to the first cache line being accessed and without an intervening memory access to the first subregion.

4. The apparatus of claim 3, wherein the prefetch circuitry is further to:
   in response to determining that the second delta value is one of the plurality of delta values in the first subregion entry, increment a second frequency value mapped to the second delta value in the first subregion entry.

5. The apparatus of claim 3, wherein the prefetch circuitry is further to:
   in response to determining that the second delta value is not included in the plurality of delta values in the first subregion entry, store the second delta value and a second frequency value mapped to the second delta value in the first subregion entry.

6. The apparatus of claim 5, wherein the prefetch circuitry is to:
   in response to determining that the second frequency value is at least three, evict the first subregion entry from the first data structure.

7. The apparatus of claim 3, wherein the prefetch circuitry is further to:
   determine a third delta value representing a third distance between the first cache line and a third cache line in the first subregion, the third cache line to be accessed by the program prior to the second cache line being accessed, without an intervening memory access to the first subregion; and
   in response to determining that the third delta value is one of the plurality of delta values in the first subregion entry, increment a third frequency value mapped to the third delta value in the first subregion entry.

8. The apparatus of claim 7, wherein the prefetch circuitry is further to:
   determine a fourth delta value representing a fourth distance between the first cache line and a fourth cache line in the first subregion, the fourth cache line to be accessed by the program prior to the third cache line being accessed, without an intervening memory access to the first subregion; and
   in response to determining that the fourth delta value is one of the plurality of delta values in the first subregion entry, increment a fourth frequency value mapped to the fourth delta value in the first subregion entry.

9. The apparatus of claim 1, wherein a first temporal window is to begin upon the first subregion entry being stored in the first data structure, and wherein the first temporal window is to end upon eviction of the first subregion entry from the first data structure.

10. The apparatus of claim 9, wherein the prefetch candidates are to be identified in response to determining that the first cache line has not been accessed by the program during the first temporal window.

11. The apparatus of claim 9, wherein the prefetch circuitry is further to:
    store, in a second data structure of the memory circuitry, a region entry to track a predetermined number of most frequently occurring delta values for the memory region; and
    load the predetermined number of most frequently occurring delta values into the first subregion entry as the plurality of delta values.

12. The apparatus of claim 11, wherein the prefetch circuitry is further to:
    prior to the first temporal window, evict from the first data structure a second subregion entry corresponding to the second subregion of the memory region; and
    update the predetermined number of most frequently occurring delta values in the region entry with a plurality of selected delta values from the second subregion entry.

13. The apparatus of claim 12, wherein the prefetch circuitry is further to:
    select the plurality of selected delta values in the second subregion entry to update the predetermined number of most frequently occurring delta values in the region entry based, at least in part, on respective frequency values of the plurality of selected delta values,
    wherein to update the predetermined number of most frequently occurring delta values in the region entry is to include updating corresponding frequency values in the region entry with a plurality of frequency values corresponding to the plurality of selected delta values.

14. The apparatus of claim 1, wherein the prefetch circuitry is further to:
    detect a second memory access to a fifth cache line in a third subregion of the memory region allocated to the program; and
    store a third subregion entry corresponding to the third subregion in the first data structure of the memory circuitry, wherein the third subregion entry is to include the plurality of delta values.

15. The apparatus of claim 1, wherein the first delta value is one of a second number of most frequently occurring delta values of a second plurality of delta values stored in a second subregion entry corresponding to the second subregion of the memory region prior to an eviction of the second subregion entry.

16. A system comprising:
    a processor including a cache and a prefetch unit, the prefetch unit including prefetch circuitry, and first memory circuitry, wherein the prefetch circuitry is to:
    store, in the first memory circuitry, a first subregion entry corresponding to a first subregion of a memory region allocated to a program, the first subregion entry to include a plurality of delta values, a first delta value of the plurality of delta values representing a first distance between two cache lines associated with consecutive memory accesses within a second subregion of the memory region;
    detect a first memory access of a first cache line in the first subregion;
    select one or more delta values of the plurality of delta values based on the one or more delta values being in a number of most frequently occurring delta values of the plurality of delta values in the first subregion entry;
    identify prefetch candidates based on the first cache line and the selected one or more delta values of the plurality of delta values; and
    issue at least one prefetch request based on at least two of the prefetch candidates to be prefetched into the cache.

17. The system of claim 16, wherein the prefetch circuitry is further to:
determine a second delta value representing a second distance between the first cache line in the first subregion and a second cache line in the first subregion, the second cache line to be accessed by the program prior to the first cache line being accessed and without an intervening memory access to the first subregion.

18. The system of claim 17, wherein the prefetch circuitry is further to:
in response to determining that the second delta value is one of the plurality of delta values in the first subregion entry, increment a second frequency value mapped to the second delta value in the first subregion entry.

19. The system of claim 17, wherein the prefetch circuitry is further to:
in response to determining that the second delta value is not included in the plurality of delta values in the first subregion entry, store the second delta value and a second frequency value mapped to the second delta value in the first subregion entry.

20. The system of claim 16, the system further comprising:
second memory circuitry to store a region entry to track a predetermined number of most frequently occurring delta values for the memory region; and
load the predetermined number of most frequently occurring delta values into the first subregion entry as the plurality of delta values.

21. The system of claim 20, wherein the prefetch circuitry is further to:
select the first subregion entry for eviction from the first memory circuitry;
determine that a second delta value is one of a selected number of most frequently occurring delta values in the first subregion entry based on a second frequency value and respective frequency values associated with each delta value of the plurality of delta values in the first subregion entry; and
update an existing delta value in the predetermined number of most frequently occurring delta values in the region entry with the second delta value based on determining that the second frequency value is greater than another frequency value associated with the existing delta value in the region entry.

22. A method comprising:
storing in first memory circuitry, by prefetch circuitry in a core, a first subregion entry corresponding to a first subregion of a memory region allocated to a program, wherein the first subregion entry includes a plurality of delta values, and wherein a first delta value of the plurality of delta values represents a first distance between two cache lines associated with consecutive memory accesses within a second subregion of the memory region;
detecting a first memory access of a first cache line in the first subregion;
selecting the first delta value based on the first delta value being one of a number of most frequently occurring delta values of the plurality of delta values in the first subregion entry;
identifying prefetch candidates based on the first cache line and the first delta value and on the first cache line and one or more other selected delta values of the plurality of delta values; and
issuing at least one prefetch request based on at least two of the prefetch candidates to be prefetched into a cache.

23. The method of claim 22, further comprising:
detecting a second memory access to a second cache line in a third subregion of the memory region allocated to the program; and
storing a third subregion entry corresponding to the third subregion in the first memory circuitry, wherein the third subregion entry is to include the plurality of delta values.

24. One or more machine readable storage media having instructions stored thereon, the instructions when executed by a machine are to cause the machine to:
storing in a first data structure in memory circuitry, a first subregion entry corresponding to a first subregion of a memory region allocated to a program, wherein the first subregion entry includes a plurality of delta values, and wherein a first delta value of the plurality of delta values represents a first distance between two cache lines associated with consecutive memory accesses within a second subregion of the memory region;
detecting a first memory access of a first cache line in the first subregion;
selecting a second delta value of the plurality of delta values based on the second delta value being in a number of most frequently occurring delta values of the plurality of delta values in the first subregion entry, wherein the second delta value represents a second distance between two other cache lines associated with memory accesses within the first subregion;
identifying prefetch candidates based on the first cache line and the second delta value and on the first cache line and one or more other selected delta values of the plurality of delta values; and
issuing at least one prefetch request based on at least two of the prefetch candidates to be prefetched into a cache.

25. The one or more machine readable storage media of claim 24, wherein the cache is a level one (L1) cache.

* * * * *